United States Patent
Brauer et al.

(10) Patent No.: US 11,280,724 B2
(45) Date of Patent: Mar. 22, 2022

(54) APPARATUS AND METHOD FOR PERFORMING CALIBRATION OF A DISSOLVED GAS ANALYSIS SYSTEM USING OPTICAL ABSORPTION SPECTROSCOPY AND USE THEREOF IN AN APPARATUS AND METHOD FOR PERFORMING DISSOLVED GAS ANALYSIS (DGA) ON A PIECE OF ELECTRICAL EQUIPMENT

(71) Applicant: MORGAN SCHAFFER LTD., LaSalle (CA)

(72) Inventors: Stephan Brauer, Montreal (CA); Nicholas Lebel-Buchanan, Montreal (CA); Andrew MacGillivray, Montreal (CA); Niculae Mincu, Pointe-Claire (CA); Samuel René De Cotret, Montreal (CA); Stefan Voinea, Côte Saint-Luc (CA)

(73) Assignee: MORGAN SCHAFFER LTD., Lasalle (CA)

( * ) Notice: Subject to any disclaimer, the term of this patent is extended or adjusted under 35 U.S.C. 154(b) by 0 days.

(21) Appl. No.: 17/060,925

(22) Filed: Oct. 1, 2020

(65) Prior Publication Data

US 2021/0102889 A1 Apr. 8, 2021

Related U.S. Application Data

(60) Provisional application No. 62/912,485, filed on Oct. 8, 2019.

(51) Int. Cl.
*G01J 3/42* (2006.01)
*G01N 21/25* (2006.01)
*G01N 21/3504* (2014.01)

(52) U.S. Cl.
CPC ....... *G01N 21/255* (2013.01); *G01N 21/3504* (2013.01); *G01N 2201/127* (2013.01)

(58) Field of Classification Search
CPC ............. G01N 21/3504; G01N 21/255; G01N 2201/127; G01N 2021/3174; G01N 2201/1214; G01N 21/274; G01J 3/42
See application file for complete search history.

(56) References Cited

U.S. PATENT DOCUMENTS

| | | |
|---|---|---|
| 2,806,144 A | 9/1957 | Berger |
| 4,112,737 A | 9/1978 | Morgan |

(Continued)

FOREIGN PATENT DOCUMENTS

| | | |
|---|---|---|
| WO | 2018126273 | 7/2018 |
| WO | 2018231196 | 12/2018 |

OTHER PUBLICATIONS

Notice of Allowance dated Jul. 19, 2021 in connection with U.S. Appl. No. 16/434,650—31 pages.

(Continued)

*Primary Examiner* — Abdullahi Nur

(57) ABSTRACT

A self-calibrating dissolved gas analysis apparatus and associated method are described. The dissolved gas analysis apparatus includes an analyser having an optical absorption measurement system using one or more electromagnetic energy sources to obtain optical absorption measurements associated with a gas sample. An observed response of the optical absorption measurement system is derived at least in part by using the optical absorption measurement system to obtain optical absorption measurements for a reference gas under one or more distinct moisture conditions. The derived observed response is then processed to quantify deviations between the derived observed response and an expected response and the quantified deviations are used to compen- (Continued)

sate information associated with gas concentration measurements derived by the dissolved gas analysis apparatus.

38 Claims, 16 Drawing Sheets

(56) References Cited

U.S. PATENT DOCUMENTS

| | | | |
|---|---|---|---|
| 4,444,040 A | 4/1984 | Sakai et al. |
| 4,582,950 A | 4/1986 | Busse et al. |
| 4,803,052 A | 2/1989 | Abromaitis et al. |
| 6,037,592 A | 3/2000 | Sunshine et al. |
| 6,391,096 B1 | 5/2002 | Waters et al. |
| 6,526,805 B1 | 3/2003 | Babed-Dornea et al. |
| 6,906,630 B2 | 6/2005 | Georges et al. |
| 7,239,977 B2 | 7/2007 | Fantana et al. |
| 7,255,836 B2 | 8/2007 | Lehmann et al. |
| 7,263,871 B2 | 9/2007 | Selker et al. |
| 7,398,672 B2 | 7/2008 | Riddle |
| 7,765,871 B2 | 8/2010 | Riddle |
| 8,347,687 B2 | 1/2013 | Cunningham et al. |
| 8,484,150 B2 | 7/2013 | Sparling et al. |
| 8,738,301 B2 | 5/2014 | Frotscher et al. |
| 8,743,365 B2 | 6/2014 | Dong et al. |
| 9,176,107 B2 | 11/2015 | Jeffrey et al. |
| 9,182,342 B2 | 11/2015 | Engstrand |
| 9,194,797 B2 | 11/2015 | Liu et al. |
| 9,234,834 B2 | 1/2016 | Van Mechelen et al. |
| 9,377,451 B2 | 6/2016 | Panella |
| 9,500,580 B1 | 11/2016 | Mitra et al. |
| 9,666,351 B2 | 5/2017 | Larsson |
| 9,739,706 B2 | 8/2017 | Maity et al. |
| 9,759,610 B2 | 9/2017 | Maity et al. |
| 9,869,634 B2 | 1/2018 | Palanganda Poonacha et al. |
| 9,880,142 B2 | 1/2018 | Potyrailo et al. |
| 9,884,269 B2 | 2/2018 | Hunter et al. |
| 10,001,518 B2 | 6/2018 | Cheim et al. |
| 10,024,836 B2 | 7/2018 | Robinson |
| 10,132,789 B2 | 11/2018 | Hollunder et al. |
| 10,302,618 B2 | 5/2019 | Kuriyama |
| 10,365,209 B1 | 7/2019 | Beaudoin et al. |
| 10,429,371 B2 | 10/2019 | Virtanen |
| 10,495,623 B2 | 12/2019 | Hinshaw |
| 10,832,854 B2 | 11/2020 | Bujis |
| 2009/0192340 A1 | 7/2009 | Culp et al. |
| 2011/0154806 A1 | 6/2011 | Hoyte et al. |
| 2013/0045541 A1 | 2/2013 | Fix et al. |
| 2013/0098462 A1 | 4/2013 | Hoskin |
| 2014/0025211 A1 | 1/2014 | Cheim et al. |
| 2014/0104615 A1* | 4/2014 | Kaneko ............ G01N 21/3554 356/432 |
| 2014/0165704 A1 | 6/2014 | Maity et al. |
| 2015/0355080 A1 | 12/2015 | Mitchell et al. |
| 2017/0212093 A1 | 7/2017 | Virtanen et al. |
| 2018/0209319 A1 | 7/2018 | Bradford |
| 2018/0259444 A1 | 9/2018 | Buijs et al. |
| 2018/0259451 A1 | 9/2018 | Buijs et al. |
| 2018/0321138 A1 | 11/2018 | Li et al. |
| 2019/0383731 A1 | 12/2019 | Brauer et al. |

OTHER PUBLICATIONS

Restriction Requirement dated Nov. 18, 2020 in connection with U.S. Appl. No. 16/434,650—6 pages.

Non-Final Office Action dated Apr. 29, 2021 in connection with U.S. Appl. No. 16/434,650—34 pages.

"A One ppm NDIR Methane Gas Sensor with Single Frequency Filter Denoising Algorithm"—Zhu, et al. (Published online Sep. 18, 2012).

Tang et al., "On-Line Analysis of Oil-Dissolved Gas in Power Transformers Using Fourier Transform Infrared Spectrometry", Energies, 11 (3192), Nov. 17, 2018.

* cited by examiner

APPARATUS AND METHOD FOR PERFORMING CALIBRATION OF A DISSOLVED GAS ANALYSIS SYSTEM USING OPTICAL ABSORPTION SPECTROSCOPY AND USE THEREOF IN AN APPARATUS AND METHOD FOR PERFORMING DISSOLVED GAS ANALYSIS (DGA) ON A PIECE OF ELECTRICAL EQUIPMENT

CROSS-REFERENCE TO RELATED APPLICATION

The present application claims the benefit of priority under 35 U.S. Code § 119e) based upon U.S. provisional patent application Ser. No. 62/912,485 filed on Oct. 8, 2019. The contents of the above-referenced document are incorporated herein by reference in their entirety.

TECHNICAL FIELD

This disclosure generally relates to the field of gas analysis apparatuses using optical absorption spectroscopy (such as for example infrared (IR) and ultra-violet (UV) spectroscopy) and, more specifically, to methods and devices for calibrating gas analysis apparatuses to improve and/or maintain the measurement accuracy of such apparatuses in measuring concentrations (including trace quantities) of specific gases in a gas sample. The approach described in the present document may be applied to apparatuses implementing a wide variety of gas measurement methodologies, including but without being limited to Dispersive IR, Non-dispersive IR (NDIR), Photoacoustic Spectroscopy (PAS), Fourier Transform IR (FTIR), Gas correlation spectroscopy and Tunable Diode Laser Spectroscopy. This disclosure may find practical uses in a variety of fields including the field of dissolved gas analysis (DGA) for detecting/monitoring faults in liquid-insulated electrical equipment; the field of mine safety, particularly coal mines, where gas concentrations can reach levels that are dangerous for breathing or potentially explosive; the field of gas exploration for analysing gases that emerge from the bore hole during drilling for natural gas and oil, in or, guide the drilling toward gas reserves (mud logging); identifying gas leaks in underground natural gas lines as well as other areas.

BACKGROUND

There are various commercially available devices that use optics-based methods, such as infrared light (IR) and/or ultra-violet (UV) light, to detect and to obtain gas concentration measurements from a sample gas. These monitors vary significantly by their design and even by their basic operating principles depending on the manufacturer.

Typically optical gas analysis devices, such as IR-based as well as UV-based gas analysis devices, rely on the principle that when molecules in a gas sample are exposed to light, they absorb light as they shift into an excited molecular state, as illustrated in FIG. 1. For each type of gas component, the absorbed wavelengths are different and form gas specific "fingerprints", which can be used to identify specific gas components and to quantify the concentration of such gas components in the gas sample. FIG. 2 is a schematic illustration of such a typical optical gas analysis device. As depicted, a typical optical gas analysis device 260 would include a light source 262, one or more optical filters 263, a gas cell 264 (for holding a gas sample to be analysed), a mirror 266, and detectors 268. By using the one or more optical filters 263 to select specific wavelength ranges and then measuring the light received at the detectors 268, it is possible to derive measurements conveying concentrations of some specific types of gases.

While the principles of operation of optical gas analysis devices, such as IR-based as well as UV-based gas analysis devices, are known, challenges arise when applying these principles in certain practical implementations in particular in implementations in which it is desirable to obtain gas concentration measurements for trace quantities of certain specific gases. In particular, conventional systems are typically unsuitable for measuring a quantity of a specific gas when the quantity of the specific gas present in a gas sample is very small relative to the gas sample and these conventional systems are neither sufficiently sensitive nor sufficiently selective to be able to discern trace quantities of specific gases.

One specific practical area in which it is desirable to obtain gas concentration measurements for trace quantities of specific gases in a gas sample is in the field of dissolved gas analysis (DGA) for detecting/monitoring faults in liquid insulated electrical equipment. Electrical insulating liquid (such as for example mineral oil) is commonly used in equipment that serves in the generating, transmitting, and distributing of electrical power. Such equipment generally includes oil-immersed transformers, tap-changers and circuit breakers. In such equipment, the liquid acts both as an electrical insulating medium and a vehicle for heat dissipation. When a fault occurs in such electrical equipment, fault gases may evolve in the insulating liquid.

Some of the gases that are typically associated with specific fault types in such equipment are Hydrogen ($H_2$), Carbon Dioxide ($CO_2$), Carbon Monoxide (CO), Ethane ($C_2H_6$), Methane ($CH_4$), Ethylene ($C_2H_4$) and Acetylene ($C_2H_2$). Analysis of one or more of such fault gases may be used to provide a diagnosis of the health of electrical equipment.

In this regard, various practical Dissolved Gas Analysis (DGA) applications have been previously suggested for detecting such fault gases in equipment that serves in the generating, transmitting and distributing of electrical power.

For example, U.S. Pat. No. 8,347,687 to Cunningham describes an apparatus for performing dissolved gas analysis on electrical insulating oil which makes use of photoacoustic spectroscopy (PAS) to analyze the fault gases. The contents of the aforementioned document are incorporated herein by reference. The apparatus includes a gas extraction module in which the fault gases are released from the oil by means of an agitator into a head space of the module. After a period of agitation, head space equilibrium is achieved, and the gases are pumped into an analysis cell where measurements of the head space gases are performed with a PAS module. The apparatus conveniently includes a fluid conduit configuration which enables the measure of oil samples from different sources relatively easily while minimizing or avoiding cross contamination.

A deficiency associated with many commonly used apparatuses performing dissolved gas analysis on electrical insulating liquid (such as for example electrical insulating oil) using electro-magnetic energy absorption methods is that their components are prone to drift, which affects the consistency of the measurements over time. For example, the intensity and alignment of the electro-magnetic energy source (e.g. an IR-source) may change over time, leading to changes in the measurements taken. Examples of other elements that may contribute to the drift in IR-based methods include variations in the transmission and/or reflective properties of the optical elements in the IR measurement device (due to contamination of surfaces for example) as well as the deterioration of the coating on some IR filters used to modulate the wavelength of one or more IR-sources used in the devices. In cases where photo-acoustic spectroscopy (PAS) is used to analyze gas concentrations, changes in the sensitivity of the microphones used can also affect the measurements.

In order to compensate for the effects of drift associated with the use of infra-red absorption methods, for example, periodic calibration of the measurement system is required. In the DGA industry, calibration is sometimes achieved using oil samples. According to a typical implementation of such an approach, an oil sample of the electrical insulating oil may be obtained manually, for example using a syringe, and the oil sample may be sent to a specialized gas testing laboratory for analysis. Based on the analysis results obtained from the gas testing laboratory, which may convey various gas concentration measurements, the IR-based system can then be re-calibrated to adjust the automated measurements. However, since such syringe samples are usually taken annually, the IR-based measurement system can drift significantly between these calibration events.

While manual calibration methods of the type described above, may be applied for calibrating practical IR-based system, they increase the cost and complexity of maintaining the associated DGA-testing equipment. In particular, each calibration instance implies a number of tasks including for example: travelling to the site to take an oil sample; sending the oil sample to the laboratory; monitoring the receipt of results; re-calibrating the system based on the results and repeating this process periodically. Moreover, if measurements change in between calibration events, it can be unclear if this change is due to a problem in the transformer, or due to drift of the DGA measurement system.

While some other solutions have been proposed in connection with DGA measurements systems to calibrate the monitoring devices locally, in order to provide a reasonably high level of measurement accuracy, these typically require the use of consumable calibration gases in order to operate. The consumable calibration gases are stored in gas cylinders, which must be replaced periodically, driving up the cost and complexity of operating such DGA systems.

Against the background described above, it is clear that there remains a need in the industry to provide improved processes and devices for calibrating gas analysis apparatuses that alleviate at least some of the deficiencies of the existing devices and methods.

SUMMARY

This Summary is provided to introduce a selection of concepts in a simplified form that are further described below in the Detailed Description. This Summary is not intended to identify all key aspects and/or essential aspects of the claimed subject matter.

An approach proposed in the present document is directed at a process and associated apparatus for performing periodic calibrations of a gas measurement system using information pertaining to moisture conditions, such as measurements that may be obtained by a moisture sensor within the gas measurement system. In accordance with some practical implementations, calibration of the gas measurement system includes filling the gas measurement system with a reference gas, such as but not limited to ambient air, under distinct moisture conditions including for example, but not limited to, a) a moisture level similar to that of the ambient air which will generally vary depending on local conditions, and/or b) a high moisture level resulting from exposure to a source of water vapour, and/or c) a low moisture level resulting from exposure to a moisture absorbing material. Measurements are obtained under the distinct moisture conditions and used to calibrate measurements obtained by the gas measurement system.

Advantageously, some practical implementations adopting the approach proposed to the present document may allow for regular/on-site calibration of an IR-based gas measurement system, which to turn would allow improved long-term accuracy of the gas measurements obtained. Moreover, implementations using ambient air as a reference gas may have the added advantage of providing improved long-term accuracy of the gas measurements obtained without the encumbrances of compressed gas cylinders and without required manual handling of oil samples.

In accordance with a first aspect, this disclosure relates to a method for calibrating a dissolved gas analysis apparatus including an analyser having an optical absorption measurement system configured to use one or more electromagnetic energy sources to obtain optical absorption measurements associated with a gas sample. The method comprises:

a. deriving an observed response of the optical absorption measurement system at least in part by using the optical absorption measurement system to obtain optical absorption measurements for a reference gas under a plurality of distinct moisture conditions and processing the obtained optical absorption measurements under the plurality of distinct moisture conditions to derive the observed response of the optical absorption measurement system;

b. processing the derived observed response of the optical absorption measurement system to quantify deviations between the derived observed response and an expected response of the optical absorption measurement system;

c. using the quantified deviations between the derived observed response and the expected response to compensate information associated with gas concentration measurements derived by the dissolved gas analysis apparatus.

In specific implementations, the stets of deriving the observed response of the optical absorption measurement system may include using a moisture sensor to obtain moisture level measurements for the reference gas under the plurality of distinct moisture conditions. In some specific implementations, the moisture sensor may be a capacitive moisture sensor or any other suitable type of moisture sensor.

In some implementations, the obtained moisture level measurements may convey moisture contents in the reference gas under the plurality of distinct moisture conditions and/or changes in moisture content in the reference gas.

In some specific implementations, the step of deriving the observed response of the optical absorption measurement system may include processing the moisture level measurements obtained by the moisture sensor and the obtained optical absorption measurements.

In some specific implementations, the plurality of distinct moisture conditions may include at least one moisture condition. In some other implementations, the plurality of distinct moisture conditions may include at least two moisture conditions. The specific moisture conditions in the plurality of distinct moisture conditions may vary between specific implementations.

In some specific implementations, at least one distinct moisture condition may be associated with a moisture level established, at least in part, by a moisture level of ambient air.

In some specific implementations, at least one of the plurality of distinct moisture conditions may be associated with a moisture level higher than a moisture level of ambient air. In some specific practical implementations, the moisture level higher than the moisture level of ambient air may result from exposure of the reference gas to a source of water vapor. In such implementations, the exposure of the reference gas to the source of water vapor may be made either directly or via a moisture permeable membrane.

In some specific implementations, at least one of the plurality of distinct moisture conditions may be associated with a moisture level lower than a moisture level of ambient air. In some specific practical implementations, the moisture level lower than the moisture level of ambient air may result from exposure of the reference gas to a moisture absorbing material. In such implementations, the exposure of the reference gas to the moisture absorbing material may be made either directly or via a moisture permeable membrane.

In specific implementations, the step of deriving the observed response of the optical absorption measurement system may include using a humidity control system to induce in the reference gas a specific moisture condition amongst the plurality of distinct moisture conditions and processing optical absorption measurements under the specific moisture condition to derive at least part of the observed response of the optical absorption measurement system. In some specific implementations, the humidity control system may include a moisture absorbing material and/or a source of water vapor to induce the specific moisture condition in the reference gas. The humidity control system may also include a membrane that is partially permeable to moisture, for example a membrane characterized by a permeability to moisture that is greater than a permeability to other gases.

In some specific implementations, the step of deriving the observed response of the optical absorption measurement system may be performed at least in part by: (i) filling a gas measurement chamber in the analyser with the reference gas under each of the plurality of distinct moisture conditions; and (ii) using the optical absorption measurement system to obtain the optical absorption measurements of at least one of water vapour and specific target gases in the gas measurement chamber for the reference gas under each of the plurality of distinct moisture conditions. The reference gas may be any suitable gas including, for example, ambient air.

In some specific implementations, the step of using the optical absorption measurement system to obtain optical absorption measurements for the reference gas may include: (i) exciting a sample of the reference gas with the one or more electromagnetic energy sources to generate optical signals; and (ii) obtaining the optical absorption measurements at least in part by measuring signals generated by exciting the sample of the reference gas with the one or more electromagnetic energy sources.

In some specific implementations, the step of using the optical absorption measurement system to obtain optical absorption measurements for the reference gas may include: (i) using the one or more electromagnetic energy sources to excite a sample of the reference gas in a plurality of different wavelength ranges to generate a set of corresponding optical signals, the plurality of different wavelength ranges including one or more moisture sensitive wavelength ranges; and (ii) obtaining the optical absorption measurements at least in part by measuring the set of corresponding signals at the plurality of different wavelength ranges. The derived observed response from the optical absorption measurement system may in some cases convey response parameters associated with respective wavelength ranges including the one or more moisture sensitive wavelength ranges.

In some specific implementations, the method may comprise adjusting temperature and/or pressure characteristics of the reference gas so that the optical absorption measurements under each of the plurality of distinct moisture conditions are obtained at a temperature approaching a target temperature and/or a target pressure.

In some specific implementations, the plurality of distinct moisture conditions under which were obtained the optical absorption measurements for the reference gas are a plurality of achieved distinct moisture conditions and the expected response of the optical absorption measurement system may be derived at least in part by processing:
(1) an initial response of the absorption measurement system;
(2) a plurality of initial instinct moisture conditions associated with the initial response of the absorption measurement system; and
(3) the plurality of achieved distinct moisture conditions.

In specific practical implementations, the initial response of the optical absorption measurement system may be factory derived or, alternatively, may be derived using a field initialization process.

In practical implementations, the above described method may be periodically repeated to re-calibrate the dissolved gas analysis apparatus over time.

In some practical implementations, the information associated with gas concentration measurements derived by the gas analysis apparatus may convey concentrations of certain specific target gases, excesses (and/or insufficiencies) in concentrations of certain specific target gases, increasing/decreasing trends in concentrations and/or gas ratios and/or other information that may be useful in connection with the specific target gases. In non-limiting examples, the One or more specific target gases may be selected from the set consisting of carbon dioxide ($CO_2$), carbon monoxide (CO), ethane ($C_2N_6$), methane ($CH_4$), ethylene ($C_2H_4$) and acetylene ($C_2H_2$).

In practical implementations, at least one of the one or more electromagnetic energy sources of the method may be an IR electromagnetic energy source and the optical absorption signals may be IR absorption signals.

In accordance with another aspect, this disclosure relates to a method for calibrating a dissolved gas analysis apparatus including an analyser having an optical absorption measurement system configured to use one or more electromagnetic energy sources to obtain optical absorption measurements associated with a gas sample. The method comprises:
i. using the optical absorption measurement system to obtain optical absorption measurements, at least some of the optical absorption measurements being derived by using the optical absorption measurement system under a plurality of distinct moisture conditions;
ii. processing the obtained optical absorption measurements to derive an initial response of the optical absorption measurement system; and
iii. storing the initial response in a non-transitory computer readable medium for use in quantifying deviations between expected responses of the optical absorption measurement system and observed responses of the optical absorption measurement system.

In some specific implementations, using the optical absorption measurement system to obtain optical absorption measurements may be performed at least in part by: Willing a gas measurement chamber in the analyser with the reference gas under each of the plurality of distinct moisture conditions; and (ii) using the optical absorption measurement system to obtain the optical absorption measurements for the reference gas under each of the plurality of distinct moisture conditions. Any suitable gas may be used as the reference gas, including for example, but not being limited to, ambient air.

In some specific implementations, using the optical absorption measurement system to obtain optical absorption measurements may be performed at least in part by: (i) filling a gas measurement chamber in the analyser with a specific gas containing specific concentrations of one or more specific target gases; and (ii) using the optical absorption measurement system to obtain the optical absorption measurements for the specific gas.

In some specific implementations, using the optical absorption measurement system to obtain optical absorption measurements may be performed at least in part by obtaining optical absorption measurements for a plurality of gas samples containing specific concentrations of one or more specific target gases. In non-limiting examples of implementation, the one or more specific target gases may be selected from the set consisting of carbon dioxide ($CO_2$), carbon monoxide (CO), ethane ($C_2H_6$), methane ($CH_4$), ethylene ($C_2H_4$) and acetylene ($C_2H_2$).

In specific practical implementations, the above described method may performed as part of a factory calibration process or, alternatively, may be performed as part of a field initialization process for the dissolved gas analysis apparatus.

In accordance with another aspect, this disclosure relates to an apparatus for performing dissolved gas analysis on a piece of electrical equipment having components immersed in electrical insulating liquid. The apparatus comprises:

(1) a gas extraction system configured for extracting gas from the electrical insulating liquid;
(2) an analyser for performing gas analysis on gas samples, the analyser having an optical absorption measurement system configured to use one or more electromagnetic energy sources to obtain optical absorption measurements associated with the gas samples;
(3) a processing system programmed for deriving information associated with dissolved gas concentrations in the electrical insulating liquid at least in part by processing optical absorption measurements obtained by the analyser performing gas analysis on a specific gas sample extracted from the electrical insulating liquid, said processing system being programmed for:
  i. periodically performing a calibration process configured to quantify deviations between a derived observed response and an expected response of the optical absorption measurement system at least in part using the optical absorption measurement system of the analyser to obtain optical absorption measurements for a reference gas under a plurality of distinct moisture conditions and processing the obtained optical absorption measurements under the plurality of distinct moisture conditions to derive the observed response of the optical absorption measurement system;
  ii. compensating the information associated with the dissolved gas concentrations in the electrical insulating liquid at least in part by processing the quantified deviations derived using the calibration process.

In some specific implementations, the apparatus may be configured for selectively operating according to one of: (i) an analysis mode in which the analyser is in fluid communication with the gas extraction system for performing gas analysis on gas extracted From the electrical insulating liquid; and (ii) a calibration mode in which the analyser is in fluid communication with a source for the reference gas for deriving the response of the optical absorption measurement system.

In some specific implementations, the apparatus may include a moisture sensor for obtaining moisture level measurements for the reference gas under the plurality of distinct moisture conditions. Any suitable moisture sensor may be used, including for example but without being limited to a capacitive moisture sensor.

In specific implementations, the moisture level measurements of the apparatus may convey moisture contents in the reference gas under the plurality of distinct moisture conditions and/or changes in moisture content in the reference gas.

In some specific implementations, deriving the observed response of the optical absorption measurement system in the apparatus may include processing the moisture level measurements obtained the moisture sensor and the optical absorption measurements obtained for the reference gas under the plurality of distinct moisture conditions.

In some specific implementations, the plurality of distinct moisture conditions may include at least one moisture condition. In some other implementations, the plurality of distinct moisture conditions may include at least two moisture conditions. The specific moisture conditions in the plurality of distinct moisture conditions may vary between specific implementations.

In some specific implementations, analyser of the apparatus may comprise a humidity control system to induce in the optical absorption measurement system a specific moisture condition amongst the plurality of distinct moisture conditions. In practical implementations, the humidity control system may include a moisture absorbing material and/or a source of water vapor to induce the specific moisture condition.

In some specific implementations, the reference gas of the apparatus may be comprised of ambient air.

In some specific implementations, using the optical absorption measurement system to obtain optical absorption measurements for the reference gas may include: (i) exciting a sample of the reference gas with the one or more electromagnetic energy sources to generate optical signals; and obtaining the optical absorption measurements at least in part by measuring the signals generated by exciting the sample of the reference gas with the one or more electromagnetic energy sources.

In some specific implementations, using the optical absorption measurement system to obtain optical absorption measurements for the reference gas may include: (i) using the one or more electromagnetic energy sources to excite a sample of the reference gas in a plurality of different wavelength ranges to generate a set of corresponding optical signals, the plurality of different wavelength ranges including one or more moisture sensitive wavelength ranges; and (ii) obtaining the optical absorption measurements at least in part by measuring the set of corresponding signals at the plurality of different wavelength ranges.

In some specific implementations, the derived observed response of the optical absorption measurement system in the apparatus may convey response parameters associated with respective wavelength ranges in the plurality of different wavelength ranges including the one or more moisture sensitive wavelength ranges.

In some specific implementations, the optical absorption measurement system of the apparatus may include a plurality of optical filters for filtering the electromagnetic energy from the one or more electromagnetic energy sources to excite a sample of the reference gas in the plurality of different wavelength ranges, the optical filters in the plurality of optical filters being associated with respective wavelength ranges in the plurality of different wavelength ranges. In some practical systems, the wavelength ranges in the plurality of different wavelength ranges correspond to moisture sensitive wavelength ranges.

In some specific implementations, the apparatus comprises a temperature regulating system and/or a pressure regulating system for controlling temperature/pressure characteristics of the reference gas so that the optical absorption measurements under each of the plurality of distinct moisture conditions are obtained at a temperature and/or approaching a target temperature and/or target pressure.

In some specific implementations, the plurality of distinct moisture conditions under which were obtained the optical absorption measurements for the reference gas are a plurality of achieved distinct moisture conditions and the expected response of the optical absorption measurement system may be derived at least in part by processing:
(1) an initial response of the absorption measurement system;
(2) a plurality of initial distinct moisture conditions associated with the initial response of the absorption measurement system; and
(3) the plurality of achieved distinct moisture conditions.

In some specific implementations, the initial response of the optical absorption measurement system may be factory derived or, alternatively, may be derived using a field initialization process.

In some specific implementations, the apparatus may be configured for periodically operating according the calibration mode so that the dissolved gas analysis apparatus is periodically re-calibrated.

In some specific implementations, the information associated with dissolved gas concentrations in the apparatus may convey concentrations of one or more specific target gases, excesses (and/or insufficiencies) in concentrations of certain specific target gases, increasing/decreasing trends in concentrations and/or gas ratios and/or other information that may be useful in connection with the specific target gases. In a non-limiting example, the one or more specific target gases may be selected from the set consisting of carbon dioxide ($CO_2$), carbon monoxide (CO), ethane ($C_2H_6$), methane ($CH_4$), ethylene ($C_2H_4$) and acetylene ($C_2H_2$).

In some specific implementations, at least one of the one or more electromagnetic energy sources of the apparatus may be an IR electromagnetic energy source and the optical absorption signals may be IR absorption signals.

In some specific implementations, the apparatus may comprise a liquid inlet and a liquid outlet connectable to the piece of electrical equipment for allowing electrical insulating liquid to circulate between the piece of electrical equipment and the apparatus through a liquid circulation path, the gas extraction system being in communication with the liquid circulation path. In some implementations, the gas extraction system of the apparatus may include a semipermeable membrane for extracting gas from the electrical insulating oil. The piece of electrical equipment in the apparatus may be, for example but without being limited to, a transformer, a tap-changer and a circuit breaker.

In some specific implementations, the one or more electromagnetic energy sources of the apparatus include at least one of a light emitting diode (LED), a laser, a hot filament, a micromachined (MEMS) IR emitter, a halogen lamp and any combination of a light emitting diode (LED), a laser, a hot filament, a micromachined (MEMS) IR emitter and a halogen lamp.

In accordance with another aspect, this disclosure relates to an apparatus for performing dissolved gas analysis on a piece of electrical equipment having components immersed in electrical insulating liquid. The apparatus comprises:
(1) an analyser for performing gas analysis on a gas sample, the analyser having an optical absorption measurement system configured to use one or more electromagnetic energy sources to obtain optical absorption measurements associated with the gas sample;
(2) a processing system programmed for deriving information associated with dissolved gas concentrations in the electrical insulating liquid at least in part by processing optical absorption signals obtained by the analyser performing gas analysis on a specific gas sample extracted from the electrical insulating liquid, said processing system being programmed for compensating the information associated with dissolved gas concentrations in the electrical insulating liquid at least in part by processing quantified deviations between an observed response associated with the analyser and an expected response associated with the analyser, the observed response being derived by using the optical absorption measurement system to obtain optical absorption measurements for a reference gas under a plurality of distinct moisture conditions and processing the obtained optical absorption measurements under the plurality of distinct moisture conditions.

In accordance with another aspect, this disclosure relates to a method for calibrating a dissolved gas analysis apparatus having an optical absorption measurement system configured to use one or more electromagnetic energy sources to obtain optical absorption measurements associated with a gas sample. The method comprises:
(1) deriving an observed response of the optical absorption measurement system at least in part by processing a plurality of absorption measurements taken under a plurality of distinct moisture conditions;
(2) processing the derived observed response of the optical absorption measurement system to quantify deviations between the derived response and an expected response of the optical absorption measurement system;
(3) using the quantified deviations between the derived response and the expected response to compensate information associated with gas concentration measurements derived by the dissolved gas analysis apparatus.

The above described approach may be applied to a wide variety of optical gas measurement methodologies, including, without being limited to, Dispersive IR, Non-dispersive IR, Photoacoustic Spectroscopy, Fourier Transform IR, Gas correlation spectroscopy and Tunable Diode Laser Spectroscopy.

In accordance with some specific implementations, the de Ted information associated with the gas sample may convey concentrations and/or excesses in concentration of one or more specific target gases. The specific target gases will depend on properties of the one or more electromagnetic energy sources, including possible optical filters used in conjunction therewith. In some specific implementations, the one or more specific target gases may be selected from the set consisting of carbon dioxide ($CO_2$), carbon monoxide (CO), ethane ($C_2H_6$), methane ($CH_4$), ethylene ($C_2H_4$) and acetylene ($C_2H_2$).

In some specific practical implementations, the apparatus may be configured for establishing a communication link over a computer network with a remote computing device for transmitting derived information. The remote device may be any suitable computing device, such as for example a tablet, smartphone, computer and Supervisory Control and Data Acquisition (SCADA) system.

It is to be understood that the equipment that serves in the generating, transmitting, and distributing of electrical power, as referred to in the present description, refers to oil-immersed transformers, tap-changers and circuit breakers, and/or any other electrical asset for which detecting/measuring a gas dissolved in insulating liquid may be used as an indication of fault detection/diagnosis of the equipment.

In the present description, it is also to be understood that the term "gas" can refer to a plurality of gases and/or may embrace the term "vapour".

All features of exemplary embodiments which are described in this disclosure and are not mutually exclusive can be combined with one another. Elements of one embodiment or aspect can be utilized in the other embodiments/aspects without further mention. Other aspects and features of the present invention with become apparent to those ordinarily skilled in the art upon review of the following description of specific embodiments in conjunction with the accompanying Figures.

BRIEF DESCRIPTION OF THE DRAWINGS

A detailed description of specific exemplary embodiments is provided herein below with reference to the accompanying drawings in which.

Figure 1:
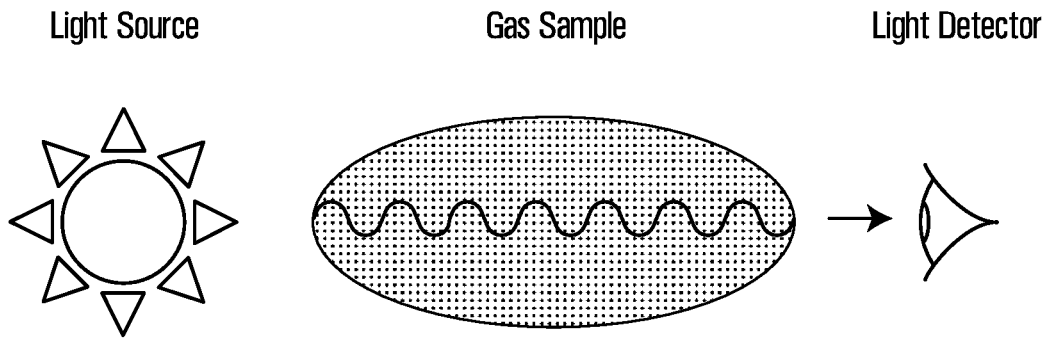
FIG. 1 is a schematic illustration of basic principles of a Eight detector configured to detect absorption by a gas sample.
Figure 2:
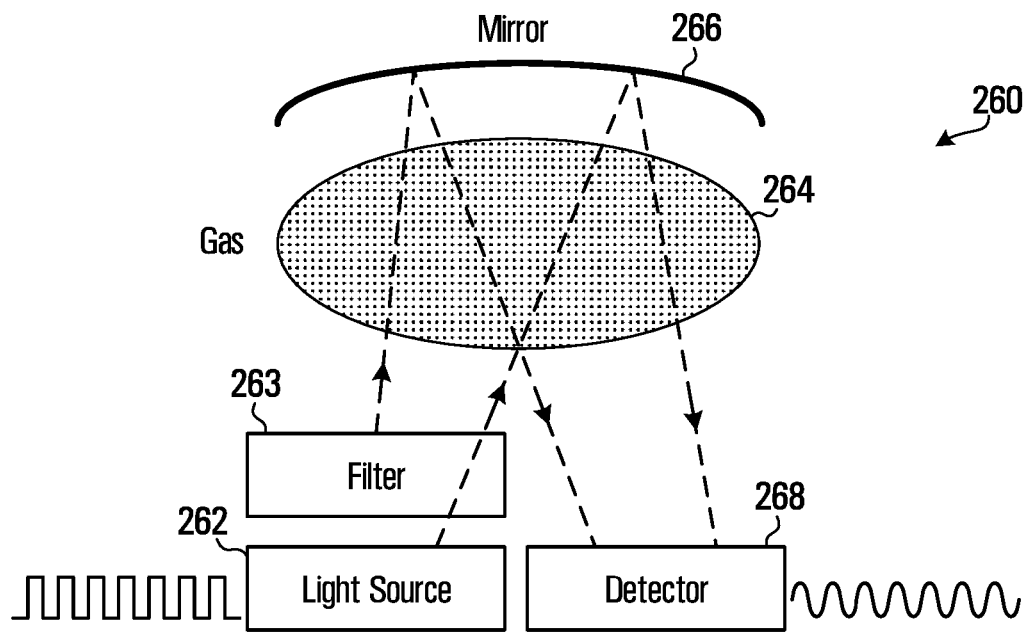
FIG. 2 is a schematic illustration of a basic optical module in accordance with known principles.

In the drawings, exemplary embodiments are illustrated by way of example. It is to be expressly understood that the description and drawings are only for the purpose of illustrating certain embodiments and are an aid for understanding. They are not intended to be a definition of the limits of the invention.

DETAILED DESCRIPTION OF EMBODIMENTS

A detailed description of one or more specific embodiments of the invention is provided below along with accompanying Figures that illustrate principles of the invention. The invention is described in connection with such embodiments, but the invention is not limited to any specific embodiment. The scope of the invention is limited only by the claims. Numerous specific details are set forth in the following description in order to provide a thorough understanding of the invention. These details are provided for the purpose of describing non-limiting examples and the invention may be practiced according to the claims without some or all of these specific details. For the purpose of clarity, technical material that is known in the technical fields related to the invention has not been described in great detail so that the invention is not unnecessarily obscured.

The approach described in the present document may be applied to providing calibration functionality to a wide variety of optical gas measurement methodologies, including but without being limited to IR-based gas measurement methodologies (Gas infrared Absorption Spectroscopy (GIRAS)) such as Dispersive IR, Non-dispersive IR, Photoacoustic Spectroscopy, Fourier Transform IR, Gas correlation spectroscopy and Tunable Diode Laser Spectroscopy.

The approaches described may also be applied to methodologies using other portions of the optical spectrum such as for example, but without being limited to, the ultra-violet (UV) spectrum. For the purpose of conciseness and simplicity, the specific embodiments presented will focus of the use of a source of radiation operating in the infra-red range of the spectrum. It is to be appreciated that other sources operating in a different range of the spectrum (such as the UV range) may also be used and that such other sources may in some cases be more optimally suited for certain specific target gases to be measured due to their specific associated absorbency spectrum.

In the description below, a very specific practical implementation of the present invention will be presented in the context of dissolved gas analysis (DGA) applications using optical absorption measurements, and in particular Infrared (IR) absorption spectroscopy measurements, for detecting/measuring concentrations of one or more specific gases that may be dissolved in electrical insulating liquid of that type that may be used for example in transformers, tap-changers and circuit breakers. It is to be appreciated that the concepts presented in the present document having regard to gas analysis using optical absorption spectroscopy measurements and the approach for calibrating devices used in performing DGA analysis may be used in other practical applications in which it is desirable to measure small quantities of gas in a gas sample. Such other practical applications may include for example, without being limited to the field of mine safety, particularly coal mines, where gas concentrations can reach levels that are dangerous for breathing or potentially explosive; the field of gas exploration for analysing gases that emerge from the bore hole during drilling for natural gas and oil, in order to guide the drilling toward gas reserves (mud logging); identifying gas leaks in underground natural gas lines as well as other fields of applications that may become apparent to the person skilled in the art view of the present description.

Infrared (IR) absorption spectroscopy includes illuminating a gas sample contained in a closed gas-filled volume or cell with electromagnetic radiations and measuring the resultant absorption signal using a detector. It is well understood in the art that each gas species has an individual infrared (IR) absorption spectrum and the level of absorption is generally directly proportional to the gas concentration in a given volume.

One practical application includes detecting diagnosing faults in electrical equipment that serves in the generation, transmission and/or distribution of electrical power for example, but not limited to, a transformer, a tap-changer or a circuit breaker, having components immersed in electrical insulating liquid, such as electrical insulating oil. In such practical implementations, dissolved gas analysis can provide timely insight into the condition of the electrical equipment by identifying and quantifying fault gases which are dissolved in the insulating liquid of the electrical equipment. Moreover, such dissolved gas analysis can assist in early detection of electrical equipment faults, minimizing costly unplanned outages and equipment failures. Examples of electrical equipment faults, such as power transformers faults, can include arcing, partial discharge and overheating. The methods presented in the present document for calibrating such dissolved gas analysis apparatuses using varying moisture conditions may allow compensating for changes in the optical measurements, including offset and gain drifts, attributable to changes in properties of components of the optical absorption measurement system rather than to actual changes in the composition of gases being measured. This capability in turn allows for more stable and reliable measurements to be obtained over a longer period of time without the need for manual calibrations of the DGA equipment.

Figure 3:
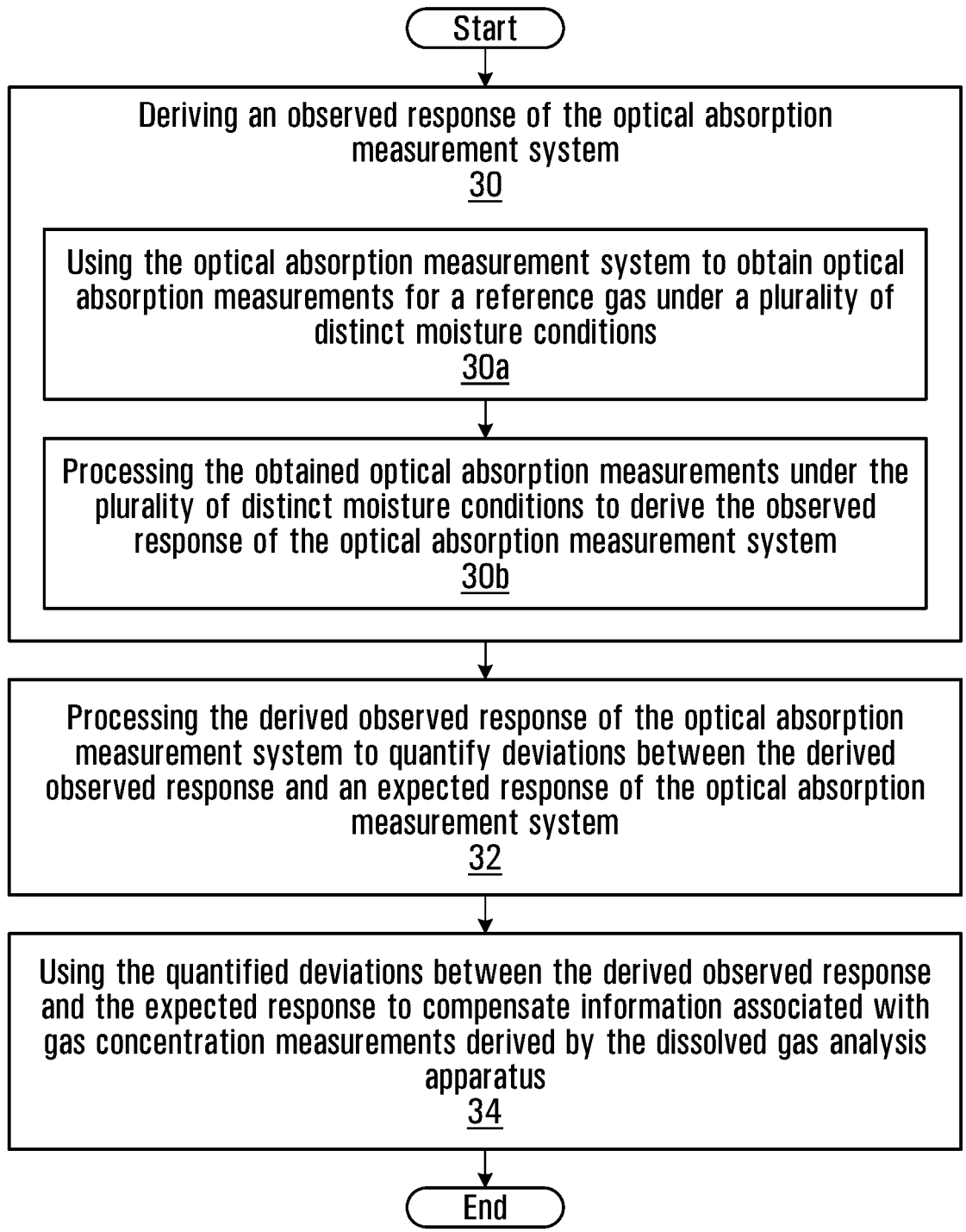
FIG. 3 is a flow diagram of a process for calibrating a dissolved gas analysis apparatus, the dissolved gas analysis apparatus including an analyser having an optical absorption measurement system configured to use one or more electromagnetic energy sources to obtain optical absorption measurements associated with a gas sample, wherein the process includes a step 30 for deriving an observed response of the optical absorption measurement system by obtaining optical absorption measurements for a reference gas under a plurality of distinct moisture conditions in accordance with an example of implementation of the present invention.
Figure 4:
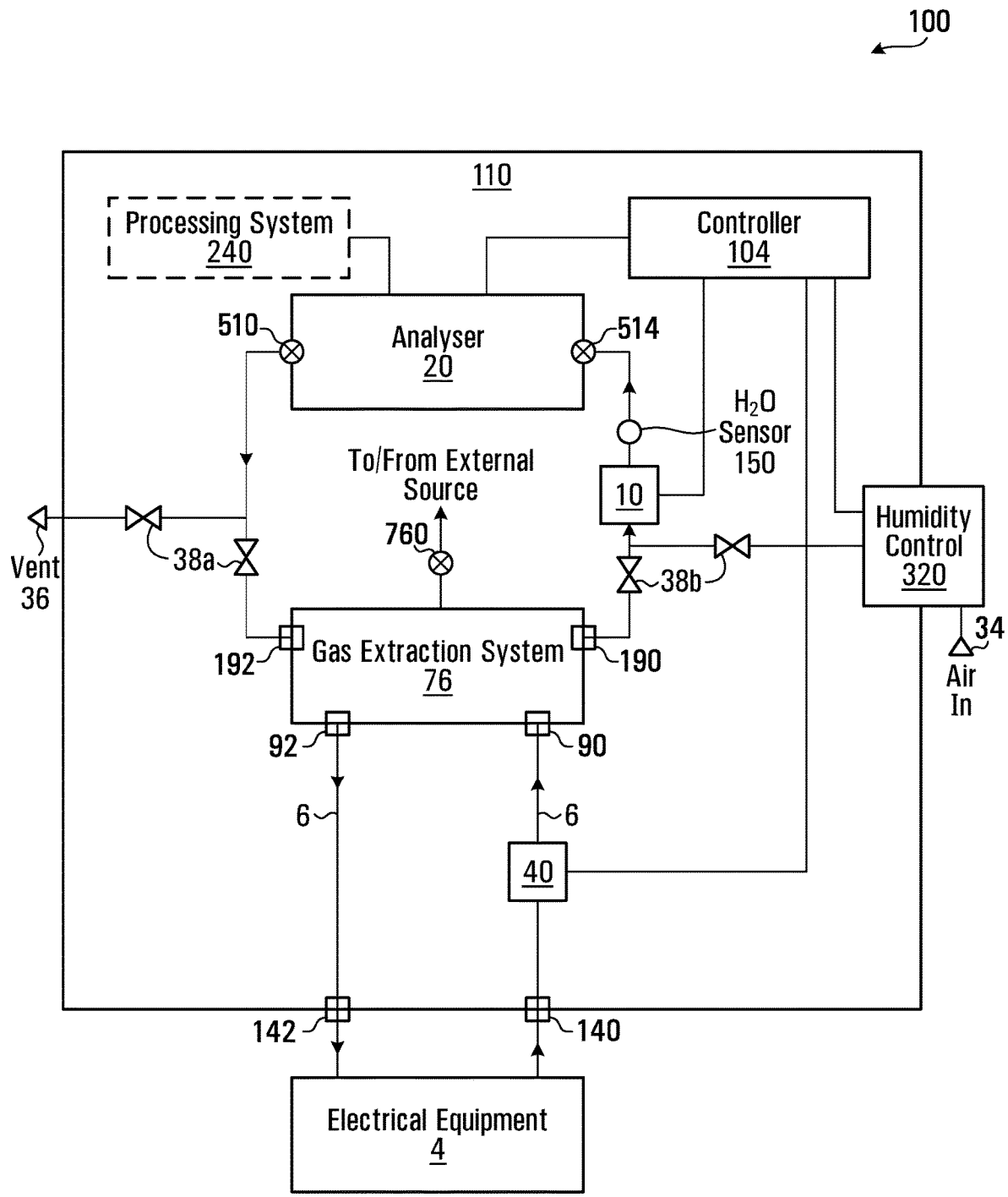
FIG. 4 is a functional block diagram of a dissolved gas analysis (DGA) apparatus 100 connected to a piece of electrical equipment 4, wherein the DGA apparatus 100 includes an analyser 20 in fluid communication with a gas extraction system 76, a controller 104 and a processing system 240, in accordance with a non-limiting example of implementation of the present invention.

FIG. 3 is a flow diagram of a process for calibrating a dissolved gas analysis apparatus 100 of the type depicted in FIG. 4 in accordance with an example of implementation of the present invention. The dissolved gas analysis apparatus 100 is configured for performing gas analysis on gas samples and includes an analyser 20 having an optical absorption measurement system using one or more electromagnetic energy sources to obtain optical absorption measurements associated with gas samples.

The process illustrated in FIG. 3 may be periodically repeated to re-calibrate the dissolved gas analysis apparatus 100 over time. Typically, it is expected that such a calibration process would be performed about once a month however more or less frequent repetitions may be performed depending of the desired accuracy of the measurements and/or the physical properties of the components of the optical absorption measurement system used in the analyser 20, which may make measurements obtained by the analyser 20 more (or less) susceptible to drift and thus require a calibration instance to be performed less (or more) frequently.

As shown, at step 30, when a calibration instance is initiated for apparatus 100, a response of the optical absorption measurement system is obtained. In the example shown, the step 30 of deriving an observed response of the optical absorption measurement system is performed at least in part by (i) at step 30a, using the optical absorption measurement system of the analyser 20 to obtain optical absorption measurements for a reference gas under a plurality of distinct moisture conditions and; by (ii) at step 30b, processing the obtained optical absorption measurements under the plurality of distinct moisture conditions to derive the observed response of the optical absorption measurement system. The plurality of distinct moisture conditions may include one, two, three or more distinct moisture conditions including for example, but not limited to, a) a moisture level similar to that of the ambient air which will generally vary depending on local conditions, and/or b) a high moisture level resulting from exposure to a source of water vapour, and/or c) a low moisture level resulting from exposure to a moisture absorbing material. In some implementations, in addition to obtained optical absorption measurements, measurements of moisture content of the reference gas under each of the distinct moisture condition in addition may be obtained using a moisture sensor.

The type of reference gas (or reference gases) that may be used during a calibration instance may vary between implementations and may be any suitable gas (or gases) based on which an initial response of the optical absorption measurement system was previously obtained under distinct moisture conditions. In specific practical implementations, the reference gas (or references gases) will be selected amongst calibration gases (such as nitrogen, nitrogen plus oxygen mixtures, argon, or other) having known concentrations of specific gas species, possibly near zero. In other practical implementations, the reference gas will be comprised of ambient air. The initial response, which may be stored in a computer readable memory device, provides baseline measurements for the optical absorption measurement system and serves as a reference to quantify deviations in measurements for a reference gas that can be attributed to changes in the properties of components in the optical absorption measurement system. The initial response stored may be may be factory derived or, alternatively, may be derived using a field initialization process. Alternatively still, the initial response may be a response of the optical absorption measurement system previously obtained during a prior recalibration instance. Manners in which the initial response may be obtained are described later on in the present document.

At step 32, the derived observed response of the optical absorption measurement system is processed to quantify deviations between the derived observed response obtained during the calibration instance and an expected response. As will be described later, the expected response may be derived in part by processing the initial response of the absorption measurement system together with information pertaining to moisture conditions present when the initial response was obtained and moisture conditions present when the observed response was obtained.

These quantified deviations provide an indication of the changes in the optical measurements, possibly including offset and gain drifts that may be attributable to components of the optical absorption measurement system. In practical implementations, these quantified deviations may be stored in a computer readable memory, for example a computer readable memory part of, or accessible by, the processing system 240 of apparatus 100 (shown in FIG. 4).

At step 34, the (stored) quantified deviations obtained at step 32 may then be used during gas analysis to compensate information associated with gas concentration measurements derived by the dissolved gas analysis apparatus 100. The information associated with gas concentration measurements may convey concentrations, or changes in concentrations, of one or more specific target gases in the gas sample. Optionally, derived concentrations of the different component species may be processed to derive diagnostic information, such as, for example but without being limited to, rates of change of gas concentrations and/or gas concentration ratios.

Advantageously, by using quantified deviations between an observed response for a reference gas obtained during a calibration instance and an expected response for that reference gas, changes in the optical measurements obtained using the optical absorption measurement system of the analyser 20, possibly including offset and gain drifts that may be attributed to changes in the properties of components in the optical absorption measurement system, may be accounted and compensated or to yield more accurate measurements over time.

Dissolved Gas Analysis Apparatus 100

Figure 6:
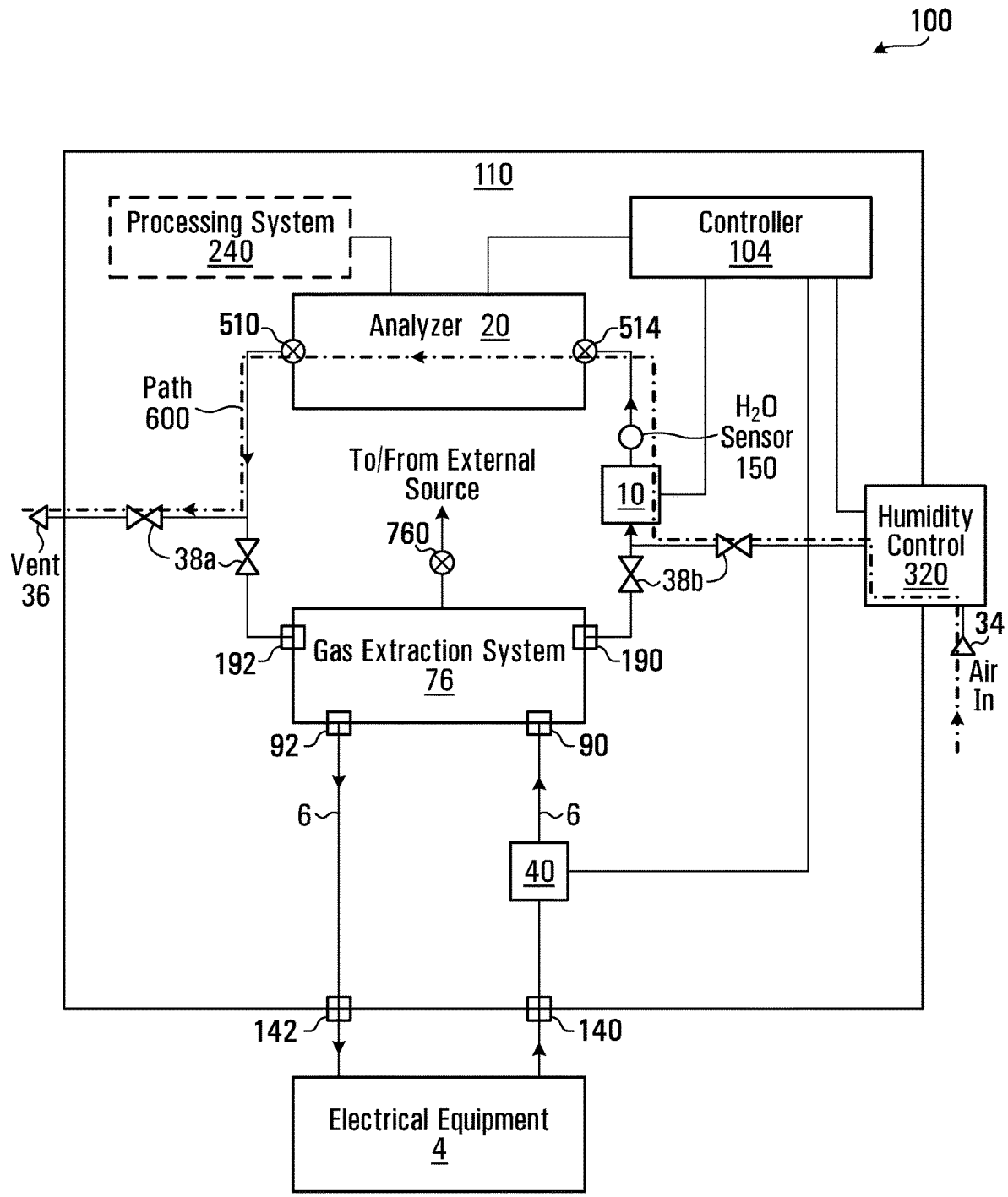
FIG. 6 shows an example of a fluid circulation path 600 established in the dissolved gas analysis PGA) apparatus 100 of FIG. 4 when the apparatus is operating accordingly to a calibration mode in accordance with a non-limiting example of implementation of the present invention.
Figure 7:
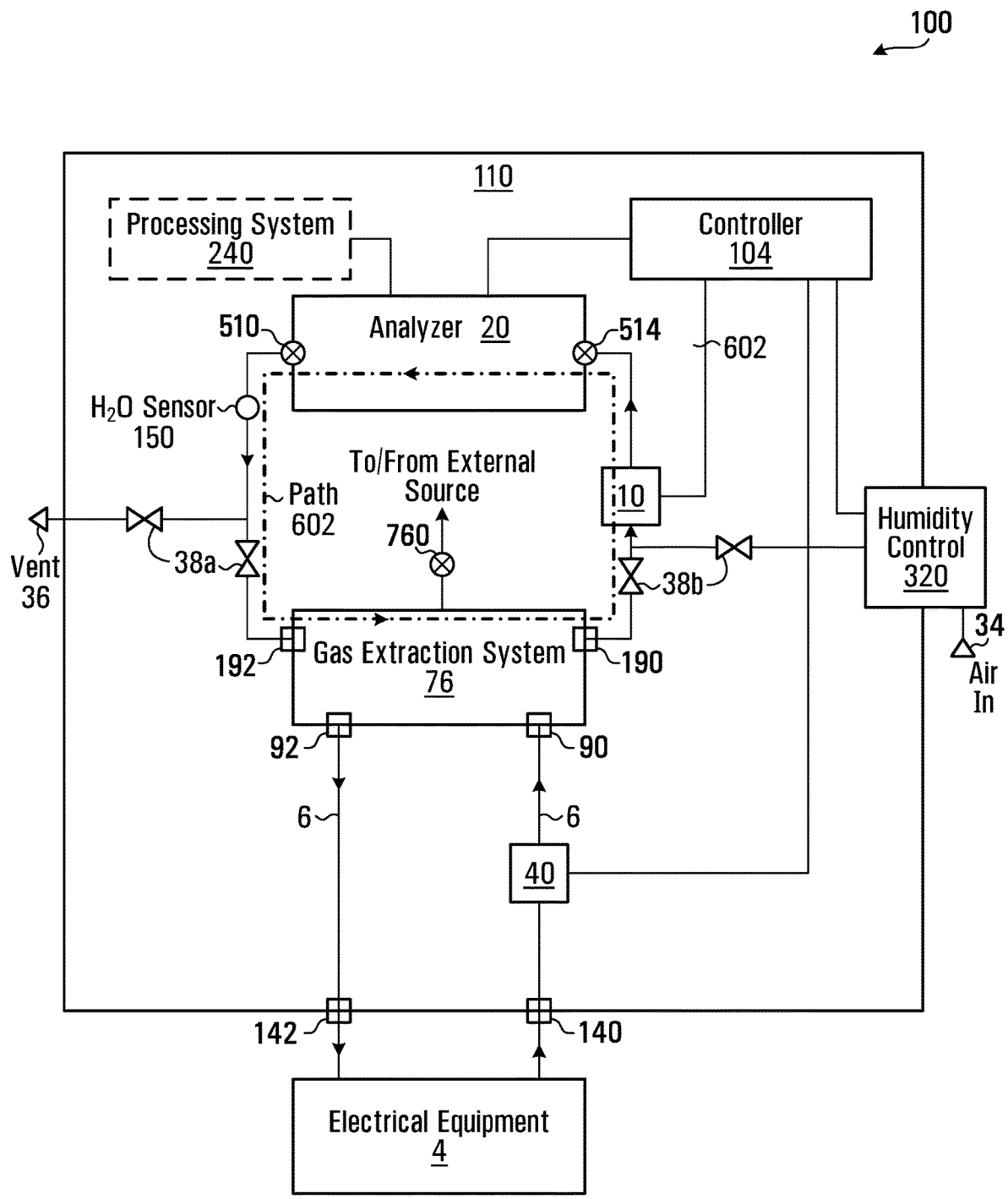
FIG. 7 shows an example of another fluid circulation path 602 established in the dissolved gas analysis PGA) apparatus 100 of FIG. 4 when the apparatus 100 is operating accordingly to an analysis mode in accordance with a non-limiting example of implementation of the present invention.

A specific example of implementation of a dissolved gas analysis (DGA) apparatus 100 including calibration capabilities of the type proposed in the present document will now be described in more detail with reference to the block diagram of FIG. 4 as well as with reference to FIG. 6 and FIG. 7. As will be described in greater detail later on, FIG. 6 shows a fluid circulation path 600 in the DGA apparatus 100 of FIG. 4 when the apparatus is operating accordingly to an calibration mode while FIG. 7 shows a fluid circulation path 602 in the DGA apparatus 100 of FIG. 4 when the apparatus s operating accordingly to an analysis mode.

In the example depicted, the apparatus 100 includes a housing 110 which encloses various elements for performing dissolved gas analysis on a piece of electrical equipment 4 having components immersed in electrical insulating liquid, such as electrical insulating oil for example, and for performing calibration processes in accordance with those described in the present disclosure. The housing 110 can be made of any suitable material including but not limited to plastic, metal or a composite.

In a specific practical implementation, the apparatus 100 can be configured to be portable and be embodied in a housing 110 of a compact size dimensions and weight such that the apparatus 100 can be used as a portable apparatus connectable to a piece of electrical equipment 4 containing electrical insulating liquid when a DGA operation is desired. In another specific practical implementation, the apparatus 100 is configured to be a fixed/stationary device, which is connected to the piece of electrical equipment 4 containing electrical insulating liquid and can be left connected to the piece of electrical equipment 4 for an extended length of time. In such cases the housing 110 of the apparatus may be configured to be securely mountable upon a supporting surface, such as a wall or frame, for example by providing suitable mounting elements and/or suitable fasteners on the housing 110 to facilitate such mounting.

In the specific example depicted, the apparatus 100 includes a liquid inlet 140 and a liquid outlet 142 connectable to the piece of electrical equipment 4 for allowing electrical insulating liquid to circulate between the piece of electrical equipment 4 and the apparatus 100 over a liquid circulation path 6, which transfers insulating liquid in and out of the apparatus 100.

The apparatus 100 further includes a gas extraction system 76 in communication with the liquid circulation path 6. The gas extraction system 76 is configured for extracting gas from the electrical insulating liquid. In some specific practical implementations, the gas extraction system 76 may be configured for holding a sample of the electrical insulating liquid from the piece of electrical equipment 4 in order to extract gas from that oil sample or, alternatively, the gas extraction system 76 may be configured for extracting gas as the electrical insulating liquid travels through the liquid circulation path 6. It is to be appreciated that the insulating liquid traveling through the liquid circulation path 6 may include dissolved gases and gas bubbles. A more detailed description of a specific practical implementation of the gas extraction system 76 and its operation is provided later in this text.

The apparatus 100 also includes an analyser 20 performing gas analysis on gas samples. As will be described later on, the analyser 20 has an optical absorption measurement system configured to use one or more electromagnetic energy sources to obtain optical absorption measurements associated with the gas samples.

The apparatus also includes a set of controllable valves, including valves 38a 38b, configured for creating different fluid circulation paths through the apparatus 100 and to enable the apparatus 100 to operate according to different modes of operation. In the example depicted, the set of controllable valves 38a 38b is configured for causing apparatus 100 to selectively operate according to: (i) an analysis mod (shown in FIG. 7) in which the analyser 20 is in fluid communication with the gas extraction system 76 along fluid circulation path 602 for performing gas analysis on gas extracted from the electrical insulating liquid; or (ii) a calibration mode (shown in FIG. 6) in which the analyser 20 is in fluid communication with a source for a reference gas along fluid circulation path 600 for deriving a response of the optical absorption measurement system to the reference gas.

When the set of controllable valves 38a 38b is controlled so as to establish a fluid circulation path through analyser 20 so that the apparatus 100 operates according to an analysis mode (shown as fluid circulation path 602 in FIG. 7), the fluid circulation path 602 allows fluid travel from the extraction system 76 to the analyser 20 as well as from the analyser 20 to the extraction system 76. In other words, in the specific example depicted, the fluid circulation path 602 creates a closed loop configuration between the analyser 20 and the gas extraction system 76 for the sample gas to travel through. An advantage of a closed loop configuration is that it may accelerate the speed at which equilibration of gas concentrations between the extraction system 76 and the gas analyser 20 is reached. While the examples depicted and described in the present description show closed loop configurations, it is to be appreciated by the person skilled in the art that, in alternate implementations (not shown), e.g., a single connecting conduit between the gas extraction system 76 and the analyser 20 may instead be used.

When the set of controllable valves 38a 38b is controlled so as to establish a fluid circulation path through analyser 20 so that the apparatus 100 operates according to the calibration mode (shown as fluid circulation path 600 in FIG. 6), the analyser 20 is placed in fluid communication with a source 34 for a reference gas. In this embodiment, the reference gas is shown as being ambient air and the source 34 is an air inlet provided to that effect in housing 110. It is to be appreciated that, while the embodiment shown in the figures makes use of ambient air for the reference gas, other reference gases may be used in alternate embodiments. For example, consumable calibration gases such as nitrogen, nitrogen plus oxygen mixtures, argon, or other may be used. In such alternate implementations, gas cylinders (not shown in the figures) storing the consumable calibration gases may be provided and be connected to the source 34 for the reference gas. The fluid circulation path 600 allows fluid travel from the source 34 for the reference gas to the analyser 20 going through a humidity control system 320 and moisture sensor 150, as well as from the analyser 20 to a vent 36 to allow the reference gas to be released from the apparatus 100.

The humidity control system 320 is configured to selectively induce a distinct moisture condition amongst a plurality of distinct moisture conditions in gases travelling there through, in this case in the reference gas provided through source 34. The distinct moisture conditions may include for example, but not limited to, a) a moisture condition in which the moisture level of the gas exiting humidity control system 320 is similar to that of the ambient air (note: it is to be appreciated that the moisture level of ambient air may vary depending on local conditions), and/or b) one or more moisture conditions in which the moisture level of the gas exiting humidity control system 320 is high, for example higher than that of ambient air, and/or c) one or more moisture conditions in which the moisture level of the gas exiting humidity control system 320 is low, for example lower than that of ambient air. The specific manner in which distinct moisture conditions may be induced may vary between implementations and many different suitable embodiments may be contemplated. For example, in some specific implementations, the humidity control system 320 may include a suitable moisture absorbing material, such as for example molecular sieve, silica jell, or calcium sulphate, in order to reduce the moisture content of a gas flowing through the humidity control system 320. Alternatively, or in addition, the humidity control system 320 may include a suitable source of water vapour, such as for example but without being limited to liquid water, or water entrapped within other materials such as cellulose or foam, in order to increase the moisture content of a gas flowing through the humidity control system 320. In some implementations, the gas may flow within a flow path in the humidity control system 320 and be directly exposed to the suitable moisture absorbing material and/or source of water vapour to induce a desired moisture condition In some alternative implementations, the humidity control system 320 may include a membrane (not shown) that is partially permeable to moisture, for example a membrane characterized by a permeability to moisture that is greater than a permeability to other gases, so that the gas flowing within a flow path in the humidity control system 320 is exposed to the suitable moisture absorbing material and/or source of water vapour through such a membrane.

In specific practical implementations, order to permit selectively inducing a specific one of the plurality of distinct moisture conditions, the humidity control system 320 may be configured with distinct internal fluid circulation paths (not shown) selectable using a set of internal valves (not shown) to cause a gas to circulate through humidity control system 320 so that the gas that is circulating is selectively exposed to either the moisture absorbent material or the source of water vapour.

The moisture sensor 150 is configured for measuring moisture levels of gases. The moisture sensor 150 may be a capacitive moisture sensor or any other suitable type of moisture sensor and may be positioned in various different locations in the apparatus 100. In FIGS. 4, 6 and 7, the moisture sensor 150 is depicted as being in a location preceding an inlet control valve 514 which controls gas transfers into the analyser 20. In the configuration shown in FIGS. 4, 6 and 7, the moisture sensor 150 remains in an established active fluid circulation path whether the apparatus is operating in an analysis mode (shown as fluid circulation path 602 in FIG. 7) or in a calibration mode (shown as fluid circulation path 600 in FIG. 6). As such, moisture sensor 150 is configured to be able to measure moisture in gases either originating from the gas extraction system 76 or from the source of reference gas 34.

It will be appreciated that, while in the configuration depicted the moisture sensor 150 is positioned in a specific location and is outside the analyser 20, other suitable configurations may be contemplated. For example, in some alternative embodiments, rather than being outside the analyser 20, the moisture sensor may be embedded into (and form an integral part of) the analyser 20 (not shown in FIG. 4). In addition, while a single moisture sensor 150 has been depicted in the example shown in FIG. 4, alternative implementations may include two, three or more moisture sensors configured to measure moisture levels in different fluid circulation paths and/or in different locations along a same fluid circulation path that may be established in the apparatus 100 depending upon the type of information that it is desirable to obtain. Alternate suitable configurations will become apparent to the person skilled in the art in view of the present descriptions and thus will not be described further here.

The apparatus 100 further includes one or more suitable pumps 10 for causing and controlling a flow of gas along the fluid circulation paths 600 and 602, in and out of the analyser 20. While a specific location for one pump 10 is shown in FIG. 4, it will be apparent to the person of skill that other locations and/or more than one pump 10 may be present depending on specific implementations.

The apparatus 100 further includes a suitable pump 40 for controlling a flow of liquid in the liquid circulation path 6 from the piece of electrical equipment 4 to the apparatus 100 and through the gas extraction system 76. It will be apparent to the person of skill that other locations for the pump 40 may be suitable for this purpose.

The apparatus 100 further includes a controller 104 for controlling the operations of the different features/components of the apparatus 100. In specific practical implementations, the controller 104 includes suitable hardware and/or software for controlling the operational settings of different features of the apparatus 100, including the pumps 40 and 10 and valves (for examples valves 38a and 38b) for controlling the flow of insulating liquid and extracted gas (through liquid circulation path 6 and fluid circulation path 602), the flow of the reference gas (through fluid circulation path 600), and the operations of the analyser 20 and the humidity control system 320. In some specific practical implementations, the controller 104 may receive electrical power from an electric power source that is connected to the controller 104 via service wiring (not shown). The controller 104 may be configured in different suitable manners, which will become apparent to the person skilled in the art in view of the present description and thus will not be described in further detail here.

In addition, the apparatus 100 may further include a processing system 240 programmed for processing signals generated by the analyser 20 when the apparatus is operating according to a calibration mode (as shown in FIG. 6), to derive, amongst other, a response of the optical absorption measurement system of the analyser 20 for a reference gas under a plurality of distinct moisture conditions and for quantifying deviations between the derived response and an expected response of the optical absorption measurement system.

The processing unit 240 is also programmed for processing signals generated by the analyser 20 when the apparatus is operating according to an analysis mode (as shown in FIG. 7), to derive information conveying concentrations of specific gas species present in the insulating liquid and/or to derive information conveying a fault status (or alternatively a fault level ranking) of the electrical equipment 4. In particular, when the apparatus is operating according to an analyses mode, the processing unit 240 is programmed to compensate information associated with gas concentration measurements at least in part by using the quantified deviations between the derived response and an expected response derived when the apparatus was operating according to a calibration mode.

It is to be appreciated that, while the gas extraction system 76 has been depicted and described with reference to FIG. 4 as lying outside the piece of electrical equipment 4, in certain alternative embodiments (not depicted in the Figures) the gas extraction system 76 may be configured differently and may be positioned in a space within the piece of electrical equipment 4. In certain implementations still (not depicted in the Figures), the liquid circulation path 6 and/or the circulation pump 40, may be omitted and the apparatus 100 may instead rely on other fluid circulation mechanisms for circulating the electrical insulating liquid through the gas extraction system 76. Such alternative physical configurations, as well as others, for providing suitable gas extraction functionality are known and/or will become apparent to the person skilled in the art of DGA in view of the present description and will therefore not be described in further detail here.

The following sections of this text will describe in greater detail various features of the apparatus 100 and the manner in which they may interact with one another in specific implementations.

Analyser 20

In the example depicted, when the apparatus 100 is operating according to the calibration mode (illustrated in FIG. 6), the analyser 20 is placed in fluid communication over circulation path 600 with the source 34 of reference gas, such as ambient air, in order to perform gas analysis on the reference gas under one or more moisture conditions. In specific practical implementations, the measurements obtained by the analyser 20 are processed to quantify deviations between a derived response to the reference gas and an expected response and for storing information conveying these quantified deviations in a computer readable medium for future use.

Conversely, when the apparatus 100 is operating according to an analysis mode (illustrated in FIG. 7), the analyser 20 is placed in fluid communication over circulation path 602 with the gas extraction system 76 for performing gas analysis on the gas extracted from the electrical insulating liquid by the gas extraction system 76 to produce an optical absorption signal associated with the extracted gas. In specific practical implementations, the analyser 20 is configured for producing a signal conveying concentration information of one of more of the following fault gases: carbon dioxide ($CO_2$), carbon monoxide (CO), ethane ($C_2H_6$), methane ($CH_4$), ethylene ($C_2H_4$) and acetylene ($C_2H_2$). More specifically, the measurements obtained by the analyser 20 are processed and the information derived therefrom is compensated using the quantified deviations derived when the apparatus 100 was operated according to the calibration mode.

The analyser 20 includes a number of elements for performing the gas analysis on either the reference gas provided by source 34 or on the gas extracted from the electrical insulating liquid.

More specifically, the analyser 20 includes an optical absorption measurement system, which in this specific embodiment is embodied as an IR absorption measurement system 200 (e.g., shown in FIG. 5), which is configured to contain and excite gas held in a sample cell 58. Depending on the mode of operation, the gas in the sample cell 58 corresponds either to gas extracted from the electrical insulating liquid by the gas extraction system 76 or to the reference gas under a specific moisture condition. Upon exciting the gas in the sample cell 58, the IR absorption measurement system 200 is configured for generating signals which conveys information associated with the gas. A more detailed description of the IR absorption measurement system 200 and its operation is provided later in this text.

The analyser 20 is in communication with the processing system 240, which may include one or more processing units programmed for processing the IR absorption signals generated by the IR absorption measurement system 200.

When the apparatus 100 is operating according to a calibration mode (illustrated in FIG. 6), the processing system 240 is programmed for processing the IR absorption signals generated by the IR absorption measurement system 200, and moisture information obtained by the moisture sensor 150, under each of a plurality of moisture conditions to derive an observed response associated with a reference gas received at 34. The derived observed response of the optical absorption measurement system may convey measurements of optical absorption signals obtained using electromagnetic sources for one or more distinct wavelength ranges for the reference gas under each of the plurality of moisture conditions. The processing system 240 may then process the derived observed response to quantify deviations between the derived observed response and an expected response of the optical absorption measurement system 200 for different wavelength ranges.

The deviations between the derived observed response and the expected response may be quantified in a number of different manners that will become apparent to the person skilled in the art in view of the present description.

Examples of processes for obtaining an initial calibration response, an expected calibration response and an observed calibration response and quantifying deviations between the expected calibration response and the observed calibration response will be described below for the purpose of illustration only.

For the purpose of these examples, we will define the following:
(1) "the moisture sensitive wavelength ranges" or "the moisture sensitive channels": a first subset of wavelength ranges for which the absorption measurement system 200 is sensitive to variations in moisture levels in the gas in the sample cell;
(2) "the other wavelength ranges" or "the other channels": a subset of wavelength ranges other than the moisture sensitive wavelength ranges;
(3) "initial moisture conditions": one or more moisture conditions present at the time optical absorption measurements are obtained when deriving an initial calibration response, each initial moisture condition being quantified by a moisture measurement obtained by a moisture sensor, such as moisture sensor 150.

It is noted that for specific implementations, the moisture sensitive channels may include one, two, three or more moisture sensitive channels. Sensitivity to moisture levels for a specific wavelength range can be determined in different manners. For example, a wavelength range may be considered to be sensitive to moisture when optical measurements for a same reference gas at different moisture levels vary in excess of 5% for a variation of 10% in moisture level.

It is also noted that the wavelength range of one channel may overlap with the wavelength range of another channel. In addition, it is to be appreciated that the optical absorption measurement system 200 may, in certain specific implementations, be configured to perform optical measurements across a continuum of wavelength range.

In a specific implementation, the same reference gas will be used for obtaining an initial calibration response and observed responses for each of the calibration instances. In another specific implementation, the reference gas used for obtaining and initial calibration response may have substantially similar optical absorption properties in the wavelength ranges used by the optical absorption measurement system, as the reference gas used for each of the calibration instances.

Examples of processes for obtaining an initial calibration response and observed responses for each calibration instance (also referred to as an "in-service calibration instance") will now be described.

Initial Calibration Response

For the initial calibration response, the process may comprise:
(1) deriving an initial response of the optical absorption measurement system 200 by obtaining optical absorption measurements for one or more of the moisture sensitive channels of the system 200, and possibly for other channels, with the system 200 containing reference gas at one or more initial moisture conditions. Each initial moisture condition may be quantified by a moisture measurement obtained by a moisture sensor, such as moisture sensor 150.
(2) for each initial moisture condition quantified by a moisture measurement, storing the measured moisture condition and the initial response of the optical measurement system for the one or more moisture sensitive channels, and possibly other channels in a memory unit, for example a memory unit in communication with processing system 240.

The one or more initial moisture conditions may include one, two, three or more distinct moisture conditions depending on implementation. It is noted that, while it is desirable to obtain measurements at many different moisture conditions, interpolations/extrapolation may be used in order to model a behavior for the optical absorption measurement system 200 between measured initial moisture conditions.

In a non-limiting example, optical measurements in two or more moisture sensitive channels may then be used to model changes in behavior of the optical absorption measurement system 200 in other channels.

In-Service Calibration Instance

During a calibration instance, the following steps may be taken:
(1) Derive the observed response of the optical absorption measurement system 200 by performing optical absorption measurements on one or more of the moisture sensitive channels of the system 200, and possibly other channels, with the system 200 containing a reference gas at one or more achieved moisture conditions. Each achieved moisture condition may be quantified using a moisture measurement obtained by a moisture sensor associated to the system 200, such as moisture sensor 150. It is noted that, while it is desirable for the achieved moisture conditions to be similar to the initial moisture conditions, it is not necessary for the achieved moisture conditions to be identical to the initial moisture conditions and interpolation/extrapolation can be used as appropriate when measurements differ.
(2) For one or more of the achieved moisture conditions, derive an expected response of the optical absorption measurement system 200 for one or more of the moisture sensitive channels using:

a. one or more moisture sensor measurements from the achieved moisture conditions,
b. one or more stored moisture sensor measurements from the initial moisture conditions, and
c. the stored initial response of the optical absorption measurement system.

For each achieved moisture condition quantified by the moisture sensor, interpolating (or extrapolating) between two or more initial moisture conditions can be performed to derive expected optical measurements assuming there has been no system drift and the reference gas is the same as used during the measurements of the initial response;

(3) Quantify deviations between the observed response and the expected response of the optical absorption measurement system 200 by using the difference between the observed response and the expected response as input to a model designed to quantify how the optical measurement system has changed since the initial response was measured. As non-limiting examples, the model may attempt to characterize how the gain, offset, or both gain and offset, of the optical gas measurement system 200 have changed on one or more channels, including moisture sensitive channels and other channels, since the initial response was measured. In the most simplified case, the model may convey an average gain change to be applied to all wavelength ranges in the plurality of wavelength ranges. It is however to be appreciated that more complex models may be developed and used in other implementations;

(4) Use the model with the quantified deviations to compensate future optical absorption measurements on other channels and possibly also on moisture sensitive channels until the next calibration instance.

When the apparatus 100 is operating according to an analysis mode (illustrated in FIG. 7), the processing system 240 is programmed for processing the IR absorption signals generated by the IR absorption measurement system 200 to derive information associated with gas extracted from the electrical insulating liquid by the gas extraction system 76. The information derived may convey concentrations of specific gas species present in the insulating liquid and/or to derive diagnostic information, which may convey a fault status (or alternatively a fault level ranking) of the electrical equipment 4. In a specific implementation, the fault status may convey the presence for absence) of a detected fault associated with the electrical insulating liquid in the electrical equipment 4, such as for example an excess concentration in one or more of certain specific fault gases. In some specific implementations, a fault level ranking may be derived and instead of the fault status or in combination therewith to convey on a graded scale a level of criticality in connection with the derived excess concentrations of certain specific fault gases. The specific scale used may vary from one implementation to the other and is not critical to the present invention and thus will not be described in further detail here.

It is a feature of the present invention that, when the apparatus 100 is operating according to an analysis mode, the processing unit 240 is programmed to compensate information associated with gas concentration measurements at least in part by using quantified deviations between a derived observed response, obtained when the apparatus is operating according to a calibration mode, and an expected response.

The specific mathematical operations applied to effect such compensation may vary as will be apparent to the person skilled in the art. In a non-limiting example, such compensation may be expressed as:

i) Adjusted measurements=G (obtained optical absorption measurements, quantified deviations)
(ii) Adjusted information=F (Adjusted measurements)

Where $G(x,y)$ is a function representing a model for compensating the measurements "x" based on calibration values "y"; and $F(z)$ is a function for obtaining desired information related to gas concentrations.

In some specific practical implementations, the processing system 240 may be configured for comparing a derived concentration of a specific target fault gas in the insulating liquid to a reference range of concentrations for that fault gas in order to identify potential deviations from expected measurements and detect potential on-going or developing faults in the electrical equipment 4.

It is to be appreciated that a detected potential on-going or developing fault in the electrical equipment 4 may be expressed in absolute terms (for example a fault is or is not present) or alternatively as a gradated fault level ranking conveying how far from an expected concentration range the measurement of the specific target fault gas is. Alternatively, or in addition, the processing system 240 may be configured for processing a derived concentration of a specific target fault gas in the insulating liquid to (i) detect excesses (and/or insufficiencies) in concentrations (e.g. by comparing the concentration to a reference range of concentrations); to detect increasing/decreasing trends in concentrations of the specific target fault gas and/or (iii) to detect excesses (and/or insufficiencies) in ratios of gases and (iv) to perform other useful assessments on the derived concentration of the specific target fault gas to derive other information that may be useful in connection with the specific fault gases.

In such a case, the processing system 240 may be configured for compensating derived optical measurements using the quantified deviations previously derived during a calibration instance before deriving the gas concentrations and before effecting the comparison with the reference range of concentrations. Advantageously, by using quantified deviations between an observed response obtained for a reference gas obtained during a calibration instance and an expected response for that reference gas under distinct moisture conditions, changes in the optical measurements, including offset and gain drifts that may be attributed to changes in the properties of components in the optical absorption measurement system may be accounted for and compensated to yield more precise measurements over time.

The processing system 240 may be further programmed for generating signals for causing the information conveying the fault status (or alternatively a fault level ranking) of the electrical equipment 4 and/or the derived information conveying concentration of specific gas species present in the insulating liquid to be displayed on a display device. The display device may be comprised of any suitable visual elements including a display screen, a series of lighting elements (e.g. light-emitting diodes (LEDs)) or any other suitable element that may suitably convey the information to a human operator. In some embodiments, the display device may be part of the apparatus 100 or, alternatively, the display device may reside in a computing device (not shown the figures) located remotely from the apparatus 100 wherein the computing device is in communication with the apparatus 100 over a data communication link.

It will be apparent to the reader that, in some embodiments, the processing system 240 functionality may be embodied, in whole or in part, on a processing assembly including suitable hardware and/or software components physically located within the apparatus 100. In such embodiment, the processing system 240 may be in communication with the analyser 20 (over circuit wiring for example) for receiving optical absorption signals generated by the measurement system 200 of the analyser 20 to derive information conveying concentrations of specific gas species present in the insulating liquid and/or to derive information conveying a fault status (or alternatively a fault level ranking) of the electrical equipment 4 and/or an observed response of the optical absorption measurement system to quantify deviations between the derived observed response and an expected response of the optical absorption measurement system. The processing system 240 may also be connected to a display device (not shown) part of the apparatus 100 and may be programmed for causing the display of the information conveying the fault status (or alternatively a fault level ranking) of the electrical equipment 4 and/or the derived information conveying concentration of specific gas species present in the insulting liquid.

In an alternative implementation, the processing system 240 may instead be embodied, in whole or in part, on a processing assembly including suitable hardware and/or software components physically located remotely from the apparatus 100. In such embodiment, the processing system 240 may be located in a remote computing device in communication with to the apparatus 100 over a short-range wireless connection or over a private or public (Internet) computer network. In such cases, it will become apparent to the person of skill in the art that the apparatus 100 would be equipped with suitable network interface hardware and software for establishing communications with the remote computing device.

In yet another alternative implementation, the processing system 240 functionality may be performed in whole or in part "in the cloud" (not shown) to derive information conveying concentrations of specific gas species present in the insulting liquid and/or to derive information conveying a fault status (or alternatively a fault level ranking) of the electrical equipment 4 and/or a response of the optical absorption measurement system to quantify deviations between the derived observe d response and an expected response of the optical absorption measurement system.

Cloud computing has, amongst other, the advantage of allowing the specific processes (including the software) used to derive useful information to be modified and/or upgrades as well as new functionality to be introduced in one centralized location and thus without requiring access to the individual physical apparatus 100. For entities making use of a large number of apparatuses 100, this may result in significant time savings and associated cost savings.

Optical Absorption Measurement System 200

Figure 5:
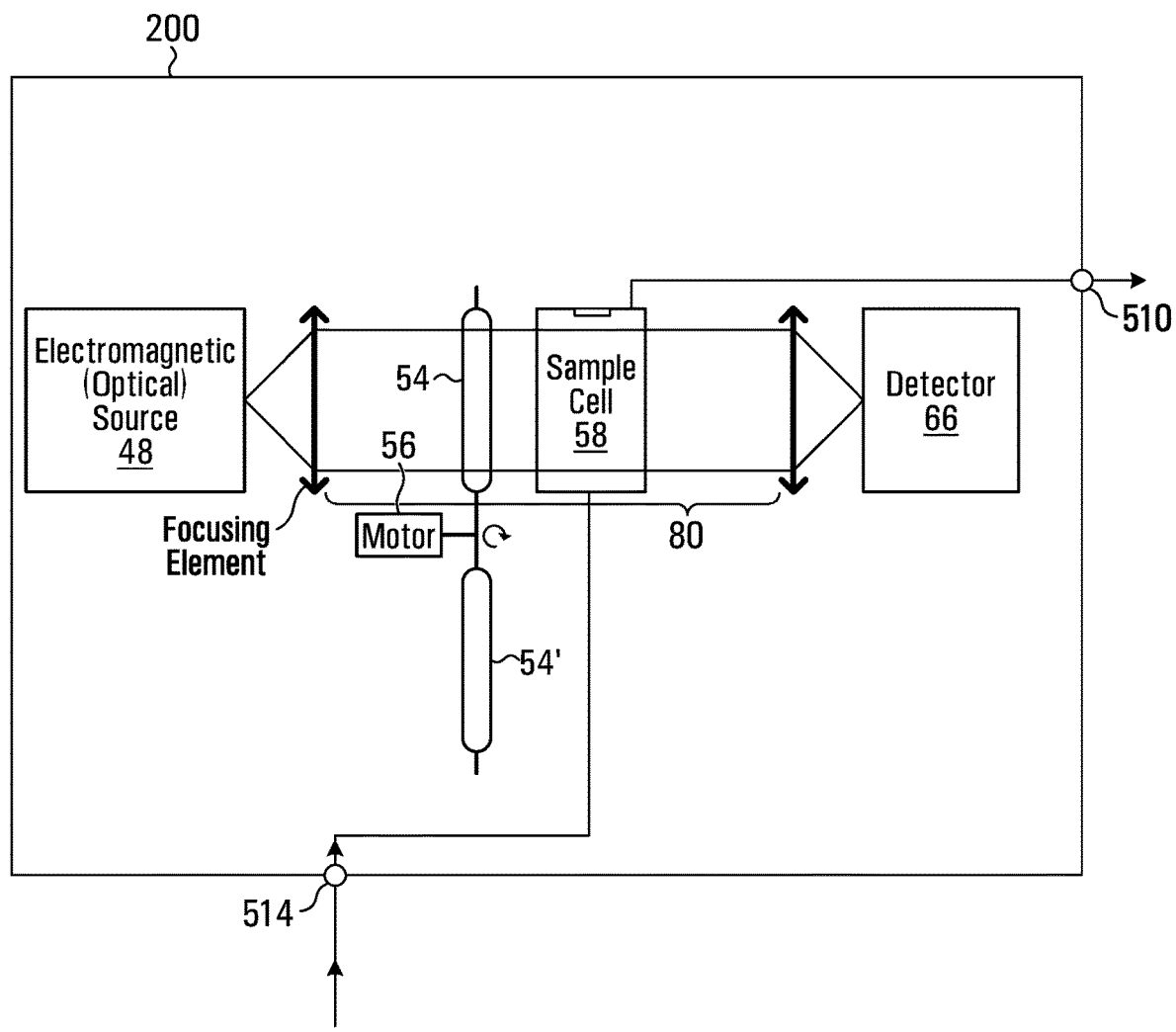
FIG. 5 shows a detailed block diagram of an optical absorption measurement system 200 for use in connection with the analyser 20 of the DGA apparatus 100 of FIG. 4 in accordance with a first specific non-limiting example of implementation of the present invention.

FIG. 5 shows a very specific configuration for an optical absorption measurement system 200 with one electromagnetic energy source 48, one detector 66 and one optical pathway 80 traversing a gas sample volume in the form of a sample cell 58 containing the gas to be analyzed. The detector 66 is configured for obtaining measurements of electromagnetic energy propagated from the electromagnetic energy source 48 through the gas the sample cell 58. The detector 66 has a sensing input for obtaining measurements of electromagnetic energy propagated through the gas the sample cell 58, and an output for generating optical absorption signals indicative of optical absorption measurements which are representative of a concentration of a specific target gas being detected. In practical implementations, detectors 66 may be embodied in, for example, without being limited to, photo-acoustic, photodetector, thermocouple, thermopile, Golay cell, pyroelectric and combinations of these.

When the apparatus 100 is operating according to the analysis mode (illustrated in FIG. 7), the sample cell 58 is connected to fluid circulation path 602 for circulating gas extracted from the electrical insulating liquid by the gas extraction system 76. When the apparatus 100 is operating according to the calibration mode (illustrated in FIG. 6), the sample cell 58 is connected to fluid circulation path 600 for circulating the reference gas provided at the source 34 under a specific moisture condition. Suitable interconnections, including suitable channels and valves, may be provided for controlling the flow of gas through the sample cell 58. It should be noted that while in the depicted example, the gas sample volume has been shown to be in the form of a sample cell 58 other types of gas sample volumes different shapes may also be contemplated. As an example of an alternate gas sample volume, the reader is invited to refer to international patent publication No. WO2016/179693 published Nov. 17, 2016, which describes a photoacoustic detector having resonant cavities (gas sample volumes) of different shapes including a cavity having a curved shape and a cavity having varying cross-sectional dimensions along its length. The contents of the aforementioned document are incorporated herein by reference.

In the configuration depicted in FIG. 5, a motor 56 is provided to turn a wheel allowing different optical filters 54 54' to be introduced in the optical pathway 80 to thereby selectively excite optical absorption of different gas species of the gas in the sample cell 58.

Figure 11A:
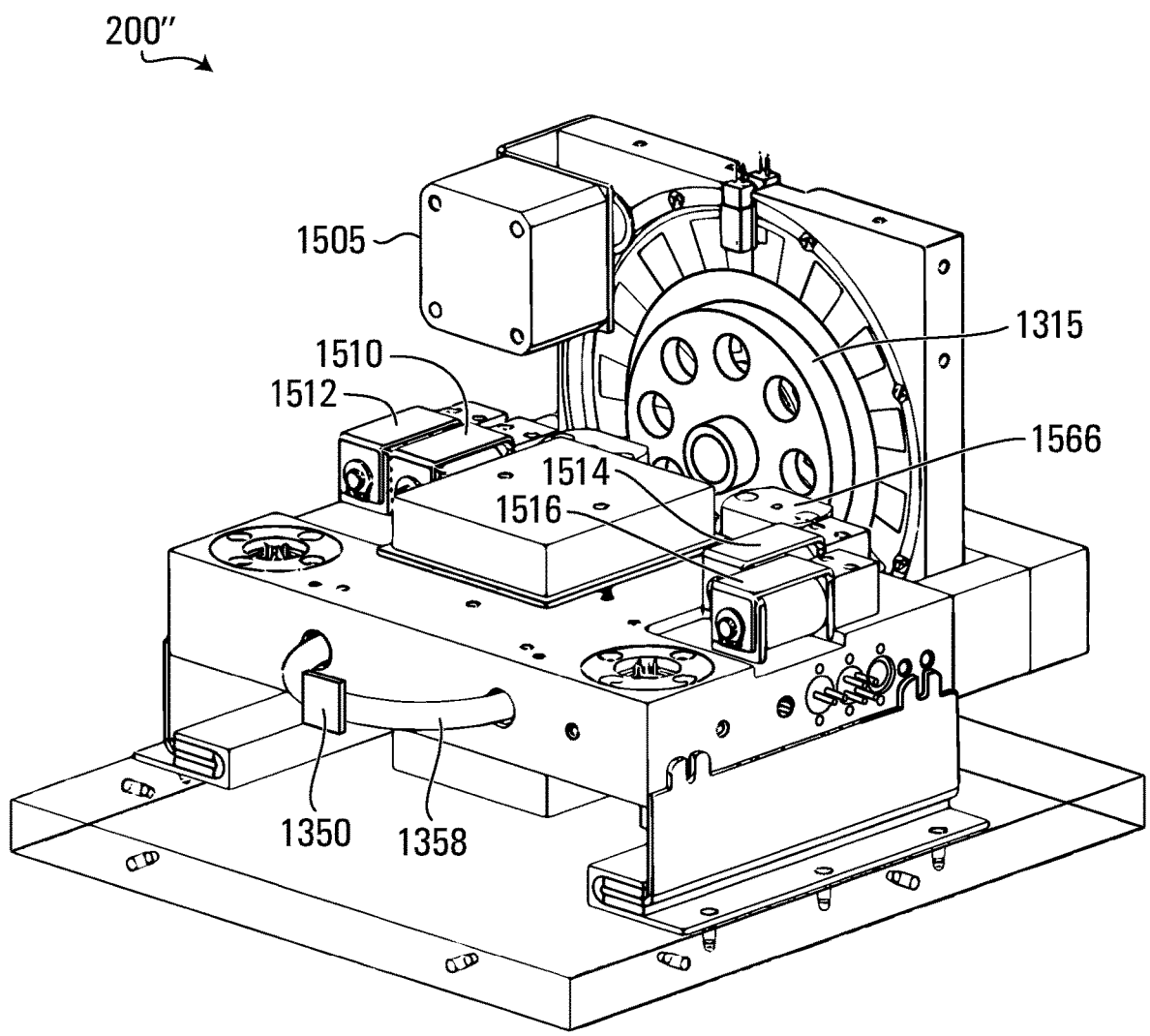
FIG. 11A shows a top front isometric view of a specific practical implementation of an optical absorption measurement system suitable for use in the analyser 20 of the DGA apparatus 100 of FIG. 4 in accordance with a non-limiting example of implementation of the present invention.
Figure 11B:
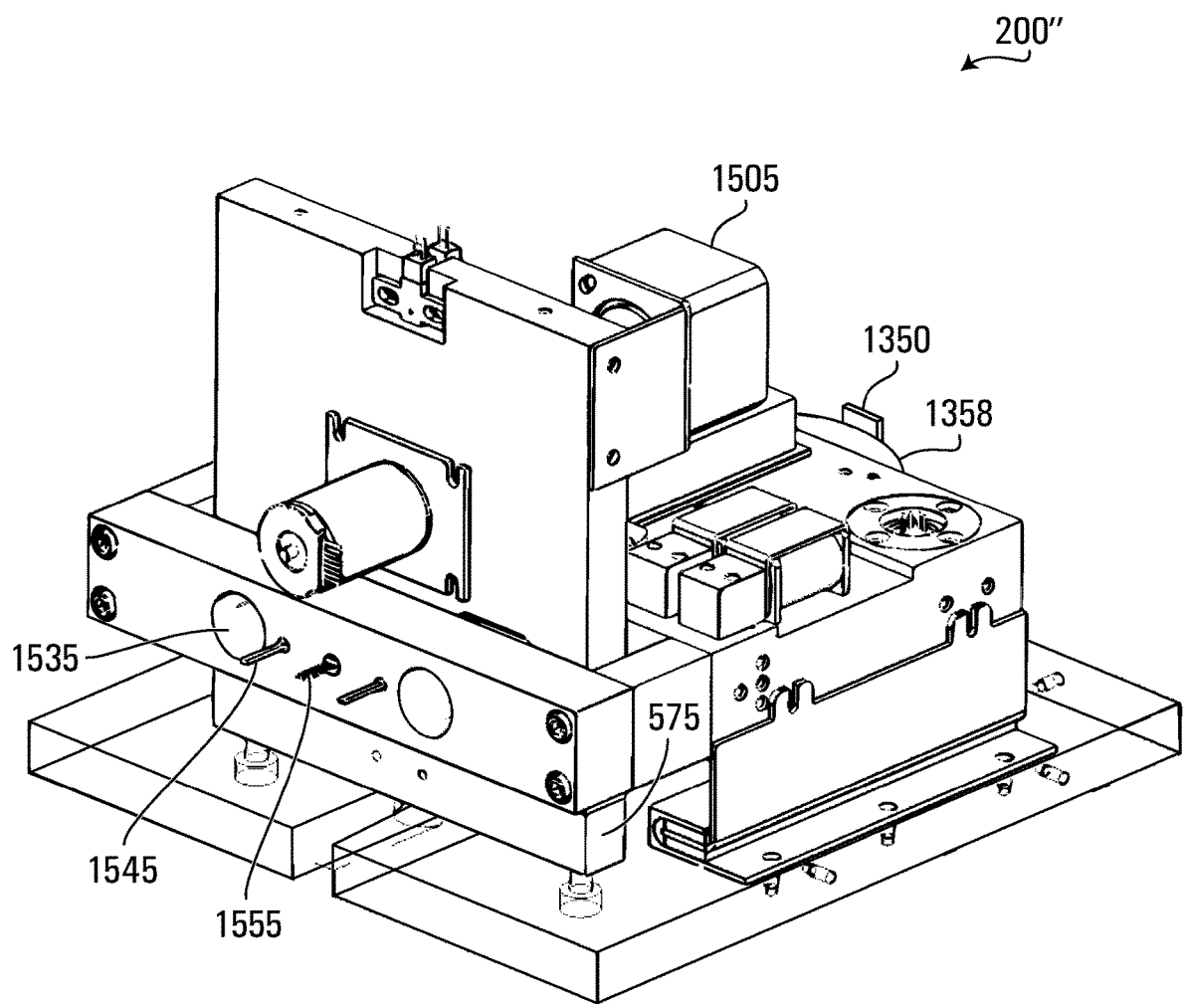
FIG. 11B shows the optical absorption measurement system of FIG. 11A with some of the components removed.

FIGS. 11A and 11B show isometric views of a specific practical implementation of another optical absorption measurement system 200" suitable for use in the analyser 20 of the DGA apparatus of FIG. 4 in accordance with a non-limiting example of implementation of the present invention. The optical absorption measurement system 200" includes control valves 510, 512, 514, 516 which control gas transfer into/out of a sample cell 1358. In specific examples, such control valves may be solenoid valves or any other suitable type of valves. In the very specific example depicted, the sample cell 1358 is in the form of a U-shaped resonant cavity of the type described in U.S. Pat. No. 10,365,209 issued Jul. 30, 2019, The content of the aforementioned patent is incorporated herein by reference.

The optical absorption measurement system 200" also includes at least one electromagnetic source (shown as being encased in block 1535 in FIG. 11B) and associated filter 1315, for generating electromagnetic energy at different wavelengths, whereby the electromagnetic energy has wavelengths capable of being absorbed by the specific target gases whose concentration is to be measured inside the sample cell 1358.

The selection of the type and characteristic of the electromagnetic energy source depends on the specific target gases whose concentration is to be measured. A target gas will have maximum absorbance of electromagnetic energy at specific wavelengths.

The electromagnetic source may comprise a light emitting diode (LED), a laser, a hot filament, a micromachined (MEMS) IR emitter, a halogen lamp and any combination of a light emitting diode (LED), a laser, a hot filament, a micromachined (MEMS) IR emitter and a halogen lamp.

In the example depicted in FIGS. 11A and 11B, a moisture are sensor 1350 is provided for measuring moisture levels of gas circulating in the sample cell 1358. The moisture sensor 1330 is in communication with the processing system 240 (shown in FIG. 4) for providing moisture measurements. These moisture measurements may be used, amongst other, when the apparatus is operating according to a calibration mode, in order to be in a position to obtain an observed response of the optical absorption measurement system 200" and compare it to an expected response to quantify deviations between the responses.

Detectors 1566 may be provided having a sensing input for obtaining measurements c electromagnetic energy propagated through the gas the sample cell 1358.

Optionally, one or more additional sensors (not shown) may be provided in association with the electromagnetic source to obtained measurements of the output of the electromagnetic source (intensity, spectral content, etc.), for example by using a second optical detector, such that the measurements may be used by the processing system 240 to take into account changes in the electromagnetic source between the differential measurements taken by detectors.

Referring to FIG. 11B in specific embodiments, the measurement system 200" may also include a temperature sensor 1555 and heater 1545 to improve stability of the IR source by having it mounted into a temperature controlled block.
Detectors 66

The optical absorption measurement system 200 shown in FIG. 5 also includes at least one detector 66 having a sensing input for obtaining measurements of electromagnetic energy propagated through the gas the sample cell 58, and an output for generating optical absorption signals indicative of optical absorption measurements which are representative of a concentration or a specific target gas whose concentration is being measured.

Some practical detectors 66 may include for example, without being limited to, photo-acoustic, photodetector, thermocouple, thermopile, Golay cell, pyroelectric and combinations of these.
Optical Filter 54

Referring to the embodiment of FIG. 5, the optical absorption measurement stem 200 may also include at least one optical filter 54 mounted in the optical pathway 80 between the electromagnetic source 48 and the sample cell 58 for filtering the electromagnetic energy according to a range of wavelengths selected in relation to the specific target gas whose concentration is being measured in the gas in the sample cell 58. The optical filter 34 can be a band pass filter to narrow a range of radiation wavelengths entering the sample cell 58. The optical filter 54 is advantageously used to selectively excite components of the gas in the sample cell 58.

The optical filter 54 may also be configured for allowing different specific wavelengths to be selectively generated in dependence of a selected specific target gas whose concentration is being measured in the gas in the sample cell 58. As an example, FIG. 5 shows a second optical filter 54', where the second optical filter 54' may be configured for filtering the electromagnetic energy according to a range of wavelengths that is different from that of optical filter 54 and selected in relation to another specific target gas whose concentration is being measured in the gas in the sample cell 58. The motor 56 is provided for selectively positioning either optical filter 54 or optical filter 54' in the optical pathway 80.

In specific implementations, one or more of the optical filters 54 54' corresponds to a moisture sensitive channel (moisture sensitive wavelength range).

FIG. 11A shows an optical filter wheel 1315 including a plurality of optical filters 54, wherein the plurality of optical filters includes optical filters associated to different wavelengths to allow preferentially exciting different specific target gases and/or for use in calibration of the optical absorption measurement system 200. The optical wheel 1315 may be operated with a filter wheel motor 1505, so as to control which optical filter 34 to place in the optical pathway of the electromagnetic source.

While the FIG. 11A shows an optical filter wheel 1315 containing a plurality of optical filters 54, it be appreciated that many other configurations, structures may be contemplated for selecting different wavelengths to allow preferentially exciting different specific target gases.

For example, in some specific practical implementations, the optical filters used may be incremental or continuously variable, and may be monochromators, band-pass filters, gratings, interferometers or combinations of these.

In a specific alternative example, not shown in the Figures, the optical filter wheel 1315 may alternatively be replaced by one or more one or more tunable optical interferometer assemblies, including for example but without being limited to Fabry-Pérot interferometer assemblies, for filtering the electromagnetic energy from the electromagnetic energy source. The one or more tunable optical interferometer assemblies may be configured to be adjustable such as to selectively filter frequencies within a frequency range. While the use of discrete optical filters, such as the type that may be used in an optical filter wheel 1315, are inherently limited by the number of optical filter 54 to a corresponding number of specific individual frequency bands, tunable optical interferometer assemblies may be dynamically tuned along a continuum of frequencies within a frequency range in a more granular manner than would be allowed with discrete optical filters. As such, the use of this type of device for filtering the electromagnetic energy from the electromagnetic energy source may allow obtaining measurements for a more complete energy absorption spectrum and provide an improved ability to accurately quantify the concentrations of individual target gas species in a gas sample. This may be particularly advantageous in applications in which one or more of the target gas species have absorbing wavelengths which are close to the absorbing wavelengths of other gas species that may be present in the gas sample. Tunable optical interferometer assemblies are known devices in the field of optics and will therefore not be described in further detail here.

In addition to the types of filters that may be contemplated, time series of optical absorption behaviors for gas in the sample cell 58 may be obtained by varying (or scanning through) wavelength-selecting elements such as monochromators and/or tunable interference filters, or by rotating a filter wheel containing fixed bandpass filters and taking multiple optical absorption measurements over time. The manners in which such an approach may be implemented will become apparent to the person skilled in the art and will therefore not be described in further detail here.

Optionally, optical chopping elements may be used including pulsed IR sources, rotating chopper wheels (not shown in the Figures) positioned in the optical pathway 80, and vibrating mechanical choppers (not shown in the Figures), which may in some implementations improve the signal-to-noise ratio.
Gas Extraction System 76

As can be seen in the specific example shown in FIG. 4, gas extraction system 76 includes a liquid inlet port 90 and a liquid outlet port 92 for connecting to the liquid circulation path 6 which transfers electrical insulating liquid from the electrical equipment 4 to the gas extraction system 76, and from the latter into the former. The gas extraction system 76 also includes fluid outlet port 190 and fluid inlet port 192 mounted thereon for connecting to fluid circulation path 602 (shown in FIG. 7) which circulates gas extracted from the electrical insulating liquid from the gas extraction system 76 into the analyser 20, and from the latter into the former, when the apparatus 100 is operating according to an analysis mode. It should be noted that the suggested locations of the ports 90, 92, 190 and 192 on the gas extraction system 76 are just exemplifications and, therefore, other connectivity ports and other port locations connected to the gas extraction system 76 can be considered.

The gas extraction system 76 may be configured for extracting gas from the electrical insulating liquid, including for example electrical insulating oil, using any suitable technique known in the art.

In some specific practical implementations, the gas extraction system 76 may extract gas from the electrical insulating liquid using any suitable known head space extraction process. Briefly, headspace extraction is achieved by the diffusion of dissolved gases into the gas phase at constant temperature and pressure conditions until the equilibrium of coexistent phases is established. Optionally, elements for mechanically agitating the gas extraction system 76 may be provided in the apparatus 100 for accelerating the extraction of gases from the electrical insulating liquid.

Figure 12:
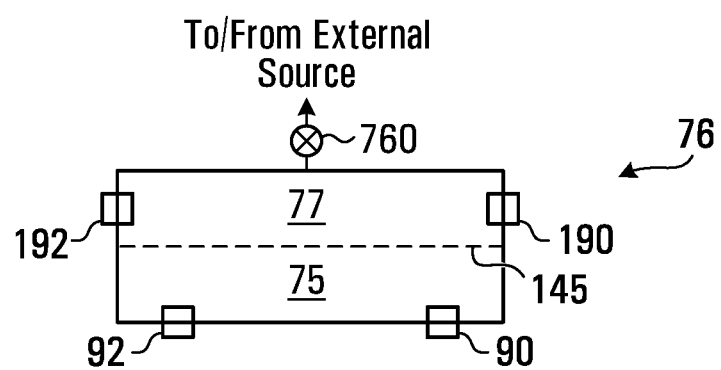
FIG. 12 is a more detailed block diagram of the gas extraction system 76 of the DGA apparatus 100 of FIG. 4 in accordance with a specific non-limiting example of implementation of the present invention.

In other specific practical implementations, the gas extraction system 76 may extract gas from the electrical insulating liquid using a semipermeable barrier 145 enclosed within the gas extraction system 76, as illustrated in FIG. 12. The semipermeable barrier 145 is configured to preferentially permeate one or more components into the gas extraction space 77, such as gases and moisture from the electrical insulating liquid while simultaneously restraining the permeation of one or more other components, such as heavy hydrocarbon gases, electrical insulating liquid molecules, and droplets, into the gas extraction space 77. Advantageously, the use of such semipermeable wall 145 can help reduce or prevent exposure of components of the analyser 20 to damaging substances present in the electrical insulating liquid, for example oil vapours and droplets, thereby improving apparatus accuracy and reliability over time.

In one practical embodiment, the semipermeable barrier 145 may include a semi-permeable membrane which permeates gases but not transformer insulating liquids. Various geometries and physical constructions for the semipermeable barrier 145 will become apparent to the person of skill in the art in view of the present disclosure. Examples of such semi-permeable membranes are known in the art and, for the purpose of conciseness, will not be further described here.

The gas extraction system 76 may be configured for extracting from the electrical insulating liquid a quantity of gas that may vary according to specific implementations. In some non-limiting examples, the extracted gas may have a volume of less than 10 cubic centimeters (10 cc) and preferably between 3 cc and 10 cc. It is to be appreciated that other suitable volumes may also be contemplated in alternative implementations.

Other configurations useful for extracting dissolved gas from a liquid can be used in the apparatus 100 and will become apparent to the person of skill in the art in view of the present disclosure.

Adjusting Pressure and Temperature Characteristics

When extracting gas from a sample of electrical insulating liquid taken from a piece of electrical equipment, it has been observed that the total pressure of the extracted gas can vary significantly, from 1 to 16 pounds per square in absolute (PSIA), depending on the design, history and operational conditions of the piece of electrical equipment.

Because the absorption response of each gas species in a gas mixture may change with total pressure and/or of the mixture, the precision and accuracy of the optical absorption measurements may be affected by pressure and/or temperature variations. Managing such gas pressure and/or temperature variability can, thus, have particular advantages in improving accuracy of the gas detection/quantification with the apparatus 100 when the apparatus is operating in according to either one of the analysis and calibration modes.

In order to account for and manage these pressure and/or temperature variations, a first approach may be to calibrate the pressure and/or temperature dependence the apparatus 100 so that pressure and/or temperature compensation may subsequently be applied to the measurements.

Another (second) approach to manage these pressure and/or temperature variations is to adjust the pressure and/or temperature in the extraction space 77 of the gas extraction system 76 (see FIG. 12) so that the pressure and/or temperature of the gas sample lies within corresponding narrower ranges. By setting that narrower pressure and/or temperature ranges to the pressure and/or temperature at which the apparatus 100 was calibrated and characterized, more precision and accuracy in the measurements of gas concentrations can be achieved.

In some specific practical implementations, the gas extraction system 76 may be provided with a pressure regulating system including a pressure regulating element 760 for mixing an external gas with the gas 77 extracted from the sample of the electrical insulating liquid to obtain a mixed-gas sample such that the mixed-gas sample has a pressure approaching a target pressure. The pressure regulating element 760 may be in communication with an external reference gas source, such as for example a tank containing Nitrogen, or alternatively, the pressure regulating element 760 may be in communication with ambient air. While a specific location for one pressure regulating element 760 is shown in the figures, it will be apparent to the person of skill that other suitable locations and/or more than one pressure regulating element 760 may be present depending on specific applications.

In some specific embodiments, the target pressure may be, for example but not limited to, between 8 to 17 PSIA; preferable between 13 to 17 PSIA.

In some specific non-limiting embodiments, the target pressure may be near atmospheric pressure. It is to be appreciated that atmospheric pressure may vary in dependence of the altitude at which the apparatus 100 is installed. For example, the apparatus may be configured and calibrated to be installed at a specific geographical location and, as such, the target pressure would be near the atmospheric pressure at the specific geographical location.

As mentioned above, in some embodiments, the external gas mixed with the gas sample extracted from the sample of the electrical insulating liquid may be ambient air. In such embodiments, the pressure regulating element 760 may mix ambient air with the gas extracted from the liquid in such a manner that the total pressure of the extracted gas (mix) is close to atmospheric pressure while the fault gas concentrations in the gas are close to equilibrium with the liquid. An advantage of using ambient air, in contrast to other possible gases, is that it is readily and freely available.

The pressure regulating element 760 may be an active pressure regulating element or alternatively may be a passive pressure regulating element.

In a specific practical implementation of an active pressure regulating element, the pressure regulating element 760 may include for example any suitable set of actionable valves and conduits known in the art for channeling an external gas into the head space 77 of the gas extraction system 76 until the gas extraction system 76 approach the target pressure.

Similarly, the gas extraction system 76 may be equipped with a suitable temperature regulating system configured to heat (or cool) the gas extraction system 76 until the gas extraction system 76 approach the target temperature.

In some embodiments, instead of, or in addition to, the optical absorption measurement system 200 is configured for managing pressure and/or temperature characteristics of the gas in the sample cell 58, to adjust the pressure and/or temperature in the sample cell 58 (see FIG. 5) so that the pressure and/or temperature of the gas sample lies within corresponding narrower ranges. Moreover, the optical absorption measurement system 200 may be configured for managing pressure and/or temperature characteristics of the gas in the sample cell 58, to adjust the pressure and/or temperature in the sample cell 58 (see FIG. 5) so that the pressure and/or temperature characteristics of the gas in the sample cell 58 within target ranges.

In this regard, the optical absorption measurement system 200 may include a pressure regulating element (not shown in the Figures) configured to introduce an external gas to the sample cell 58 to obtain a mixed-gas, wherein the obtained mixed-gas has a pressure approaching a target pressure. Different types of external gases may be used in practical implementations including, without being limited to, ambient air, dry artificial air and Nitrogen ($N_2$). Similarly, the optical absorption measurement system 200 configured to heat (or cool) the gas sample cell 58 so that the gas held in the sample cell approaches a target temperature.

Calibration Process (Calibration Mode)

Now that an embodiment of the apparatus 100 and some of its component has been described, examples of operation of the apparatus under different modes will now be presented.

As a first example, step 30 (shown in FIG. 3) of deriving a response of the optical absorption measurement system 200 when the DGA apparatus 100 is operating according to the calibration mode will be described in further detail with reference to FIGS. 8 and 5.

As depicted, at step 800, the gas measurement chamber (which in the examples shown corresponds to sample cell 58) in the analyser 20 is filled with the reference gas received through source 34 under a specific moisture condition. The specific moisture condition is induced in the reference gas received through source 34 by appropriately controlling the humidity control system 320. For example, in a first iteration of the process shown in FIG. 8, the humidity control system 320 may be configured for inducing a moisture condition in the reference gas such that the moisture level of the gas exiting humidity control system 320 is similar to that of the ambient air. In a second iteration, the humidity control system 320 may be configured for inducing a moisture condition in the reference gas such that the moisture level of the gas exiting humidity control system 320 is higher than that of ambient air, and in the next iteration a moisture level lower than that of ambient air. The sample cell 58 is filled by suitably controlling the inlet and outlet control valves 514 510 and by operating pump 10 to allow the reference gas to flow along circulation path 600. During the filling process, moisture measurements of the reference gas may be taken, for example by moisture sensor 150, in order to quantify the achieved moisture level.

Optionally, temperature and/or pressure characteristics of the reference gas in the gas measurement chamber (sample cell 58) may be controlled using suitable temperature and pressure regulating systems (not shown in the Figures) so that the optical absorption measurements are obtained at a temperature and pressure approaching a target temperature and/or target pressure. Such temperature and pressure regulating systems may be implemented in any suitable manner known in the art.

Once the gas fills the sample cell 58, the process proceeds to step 820.

At step 820, the optical absorption measurement system 200 is used to obtain optical absorption measurements of at least one of water vapour and specific target gases in the gas measurement chamber (sample cell 58) for the reference gas under the specific moisture condition and in different wavelength ranges, including in moisture sensitive wavelength ranges and possibly other wavelength ranges. In the embodiments depicted, this includes, at step 820a, exciting the sample of the reference gas in the gas measurement chamber (sample cell 58) with one or more electromagnetic energy sources 48 to generate optical signals. Optionally, the sample of the reference gas may be excited in one, two, three or more different wavelength ranges, for example by using a set of electromagnetic energy sources 48 characterized by different wavelengths and/or using suitable optical filters 54 54' introduced in the optical pathway 80, to generate a set of corresponding optical signals. In specific implementations, the different wavelength ranges may include one, two, three or more moisture sensitive wavelength ranges, and possible other wavelength ranges. At step 820b, optical absorption measurements are obtained using the detectors 66 for the one or more wavelength ranges at least in part by measuring signals generated by exciting the sample of the reference gas in the gas measurement chamber (sample cell 58).

In this manner, an observed response of the optical absorption measurement system 200 to the reference gas is obtained for a specific achieved moisture condition.

Once the optical absorption measurements are obtained for the reference gas for the specific achieved moisture condition, the process proceeds to step 840.

At step 840, if there are specific moisture conditions that have not been considered in the current calibration instance, the process returns to step 800 where the humidity control system 320 induces another different moisture condition in the reference gas. If at step 840, all desired specific moisture conditions have been considered, the process terminates and proceeds to step 32 (see FIG. 3) where deviations between the response obtained and an expected response are quantified.

Deriving an Initial Response of the Optical Absorption Measurement System 200

As described throughout the present document, the proposed process for calibrating the apparatus 100 includes the step (step 32 in FIG. 3) of quantifying deviations between an observed response obtained during a calibration instance and an expected response.

The expected response may itself derived by processing a stored initial response jointly with one or more moisture sensor measurements from moisture conditions achieved during calibration and one or more stored moisture sensor measurements from initial moisture conditions. For example, for each achieved moisture condition quantified by a moisture sensor, interpolating (or extrapolating) between two or more initial moisture conditions can be performed to derive expected optical measurements assuming there has been no system drift and the reference gas is the same as used during the measurements of the initial response.

The initial response may be derived in a number of manners. For example, the initial response may be factory derived, prior to the apparatus 100 being put into operation, and stored in a computer readable medium part of, or in communication with, processing unit 240. Alternatively, the initial response may be may be derived in situ using a field initialization process once the apparatus 100 is installed at a desired location in which it will operate. An advantage of using a field initialization process compared to a factory process is that environmental conditions used when deriving the initial response, such as the quality of the ambient air, atmospheric pressure, humidity and other, may be more similar to those encountered during regular operation of the apparatus 100 than those prevailing during a factory calibration and thus the deviations derived later on may be more likely to be attributable to changes in the properties of the components of the optical measurement system. It is noted that, while it is desirable for the achieved moisture condition to be similar to the initial moisture conditions present at the time the initial response was obtained, it is not necessary for the achieved moisture condition to be identical and that interpolation/extrapolation may be used to make required adjustments to the initial response when derived the expected response to account for such variations. It is also to be appreciated that, in some implementations, a field initialization process may be periodically repeated to effectively "reset" the stored initial response.

Figure 9:
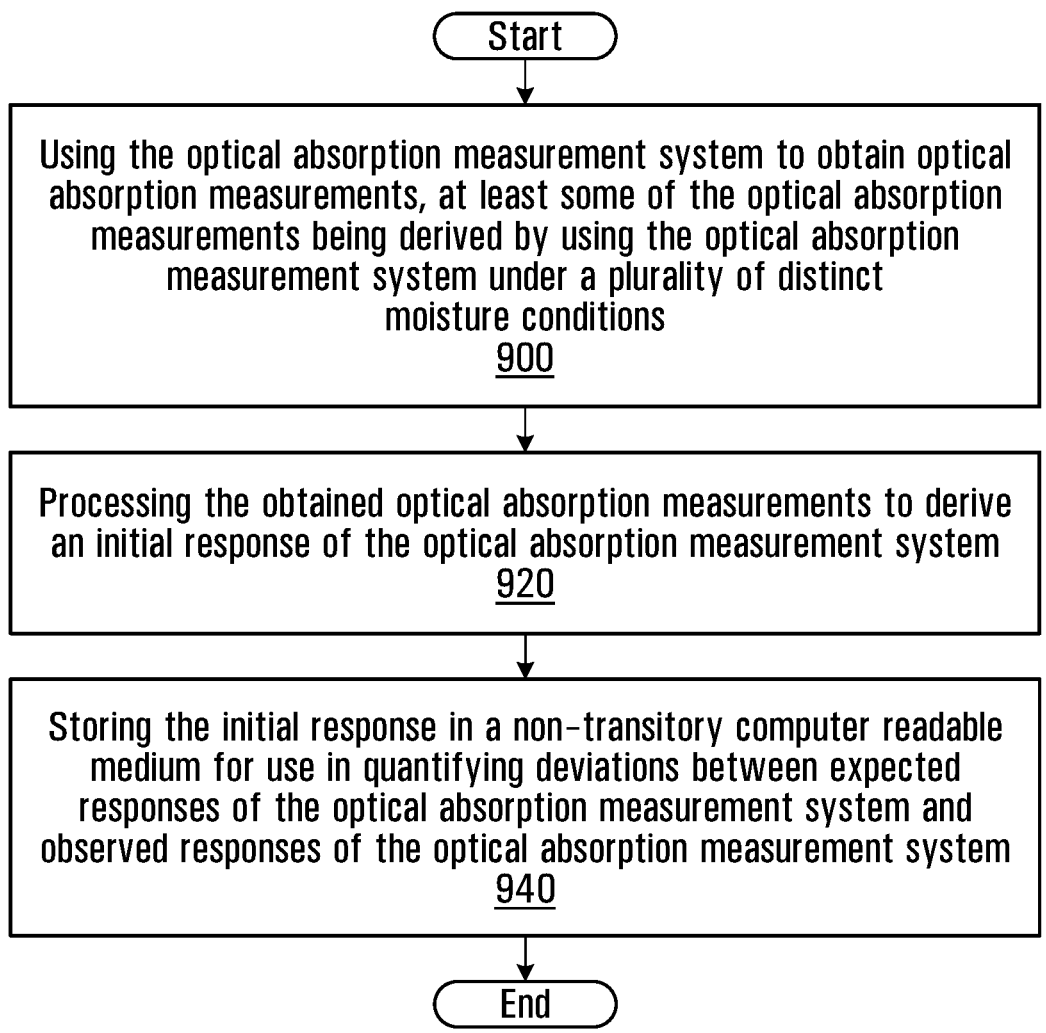
FIG. 9 is a flow diagram of a process for deriving an initial response of the optical absorption measurement system of the analyser 20, part of apparatus 100 shown in FIG. 4, in accordance with an example of implementation of the present invention.

An example of a process for deriving an initial response of the optical absorption measurement system 200, either factory derived or in situ, will now be described with reference to FIGS. 9 and 10.

As shown, at step 900, when an initial response of the optical absorption measurement system 200 is to be derived, the optical absorption measurement system of the analyser 20 is used to obtain optical absorption measurements for a reference gas under a plurality of distinct moisture conditions.

Figure 8:
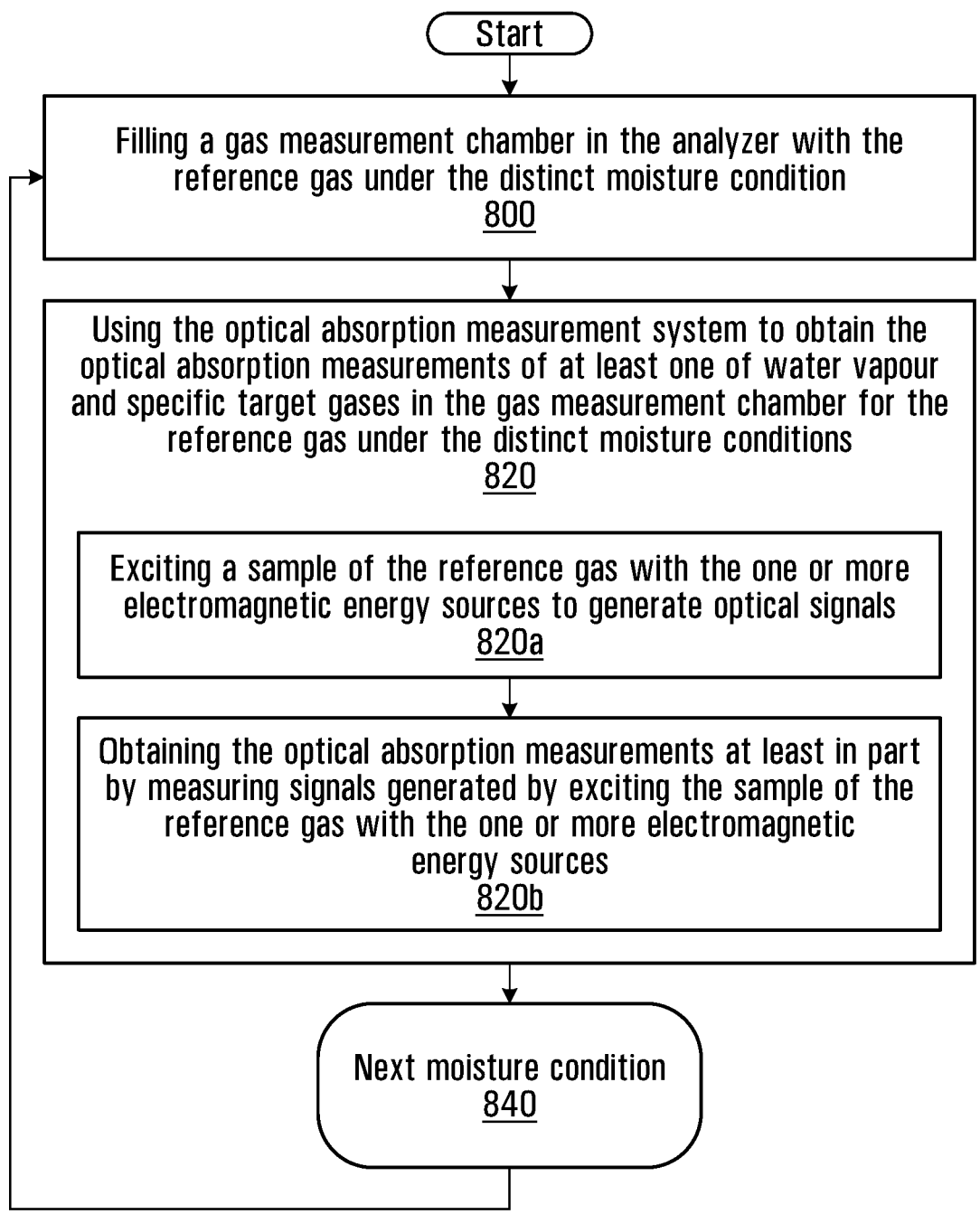
FIG. 8 is a flow diagram showing in more detail the step 30 of deriving an observed response of the optical absorption measurement system shown in the flow diagram of FIG. 3 when the DGA, apparatus shown in FIG. 4 operating according to the calibration mode as shown in FIG. 6 in accordance with an example of implementation of the present invention.
Figure 10:
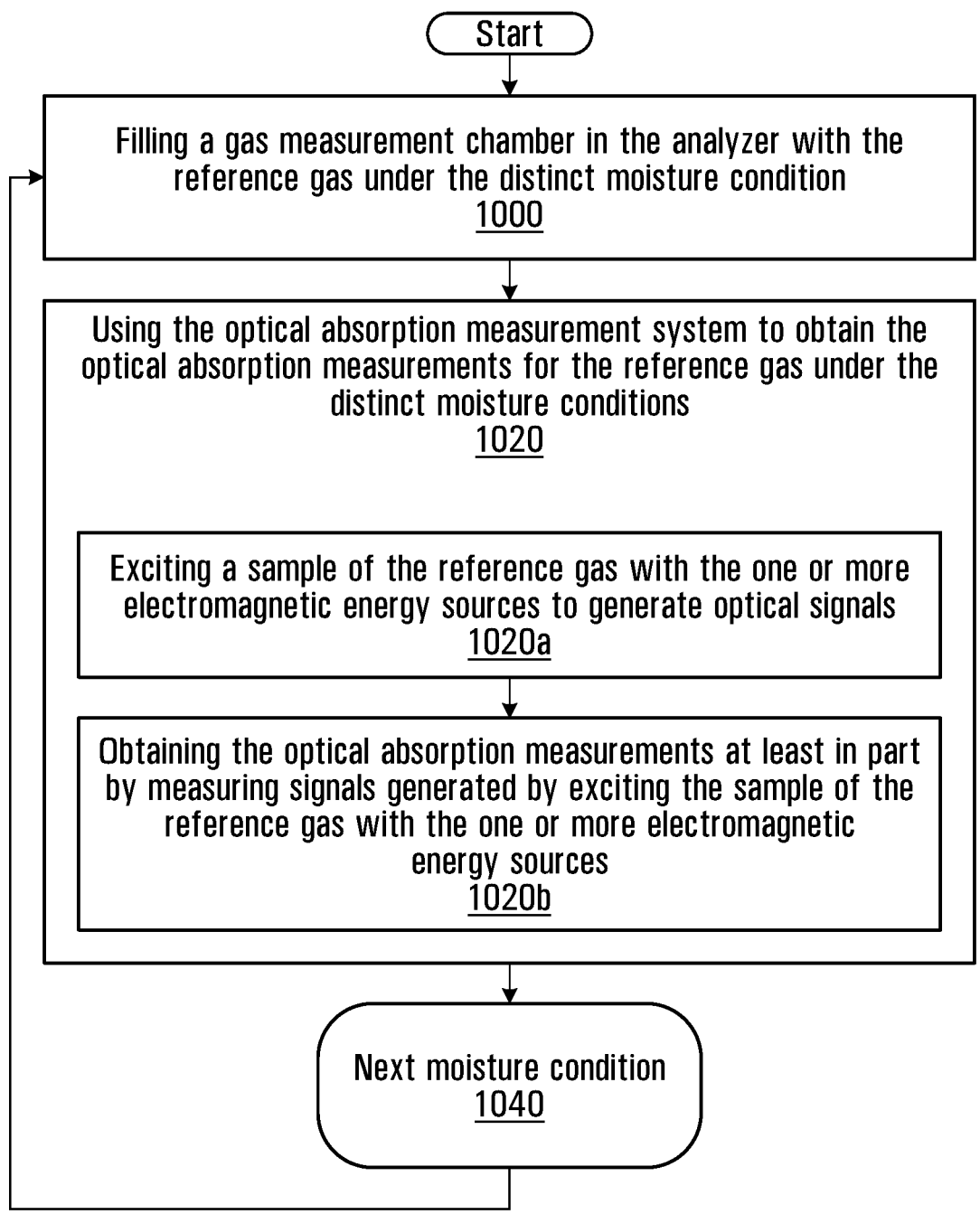
FIG. 10 is a flow diagram of a process showing in more detail the step 920 of deriving the initial response of the optical absorption measurement system shown in the flow diagram of FIG. 9 in accordance with an example of implementation of the present invention.

The manner in which step 900 may be implemented is shown in greater detail in the process depicted FIG. 10, which is similar to the process shown in FIG. 8.

As shown in FIG. 10, at step 1000 (which is analogous to step 800 in FIG. 8), the gas measurement chamber (in the examples shown corresponding to sample cell 58) in the analyser 20 is filled with the reference gas received through source 34 under a specific/distinct moisture condition. The specific moisture condition is induced in the reference gas received through source 34 by appropriately controlling the humidity control system 320. The sample cell 58 is filled by suitably controlling the inlet and outlet control valves 514 510 and operating pump 10 to allow the reference gas to flow along circulation path 600. During the filling process, moisture measurements of the reference gas may be taken, for example by moisture sensor 150. In some implementations, obtained moisture level measurements may convey moisture contents in the reference gas under the specific moisture condition and/or changes in moisture content in the reference gas.

Optionally, temperature and pressure characteristics of the reference gas in the gas measurement chamber (sample cell 58) may also be controlled using suitable temperature and pressure regulating systems (not shown in the Figures).

Once the gas fills the sample cell 58, the process proceeds to step 1020.

At step 1020 (which is analogous to step 820 of FIG. 8), the optical absorption measurement system 200 is used to obtain optical absorption measurements of at least one of water vapour and specific target gases in the gas measurement chamber (sample cell 58) For the reference gas under the specific moisture condition. In the embodiments depicted, this includes, at step 1020*a*, exciting the sample of the reference gas in the gas measurement chamber (sample cell 58) with one or more electromagnetic energy sources 48 to generate optical signals. Optionally, the sample of the reference gas may be excited in one, two, three or more different moisture sensitive wavelength ranges, and possibly other wavelength ranges, for example by using a set of electromagnetic energy sources 48 characterized by different wavelengths and/or by using suitable optical filters 54 54' introduced in the optical pathway 80, to generate a set of corresponding optical signals. At step 1020*b*, optical absorption measurements are obtained using the detectors 66 for the one or more wavelength ranges at least in part by measuring signals generated by exciting the sample of the reference gas in the gas measurement chamber (sample cell 58).

Once the optical absorption measurements are obtained for the reference gas at one or more wavelength ranges for the specific moisture condition, the process proceeds to step 1040.

At step 1040, if there are specific moisture conditions that have not been considered in the current calibration instance, the process returns to step 1000 where the humidity control system 320 inducing another different moisture condition is the reference gas. If at step 1040, all desired specific moisture conditions have been considered, the process terminates and proceeds to step 920 (see FIG. 9).

At step 920, the obtained optical absorption measurements are processed to derive the initial response of the optical absorption measurement system 200 to the reference gas under the plurality of specific moisture condition. In some specific implementations, deriving the response of the optical absorption measurement system may include processing the moisture level measurements obtained by the moisture sensor 150 jointly with the corresponding obtained optical absorption measurements so that a more precise indication of the achieved moisture content, or change in moisture content, of the reference gas can be used as a factor in deriving the initial response and model.

The process then proceeds to step 940.

At step 940, the derived initial response is stored in a non-transitory computer readable medium for later use in calibrating the apparatus. For example, it may be use in step 32 shown in FIG. 3 when quantifying deviations between an expected response of the optical absorption measurement system and an observed response of the optical absorption measurement system.

Dissolved Gas Analysis Process (Analysis Mode)

The apparatus 100 is also configured for operating in accordance with an analysis mode for performing dissolved gas analysis on the piece of electrical equipment 4 having components immersed in electrical insulating liquid.

Figure 13:
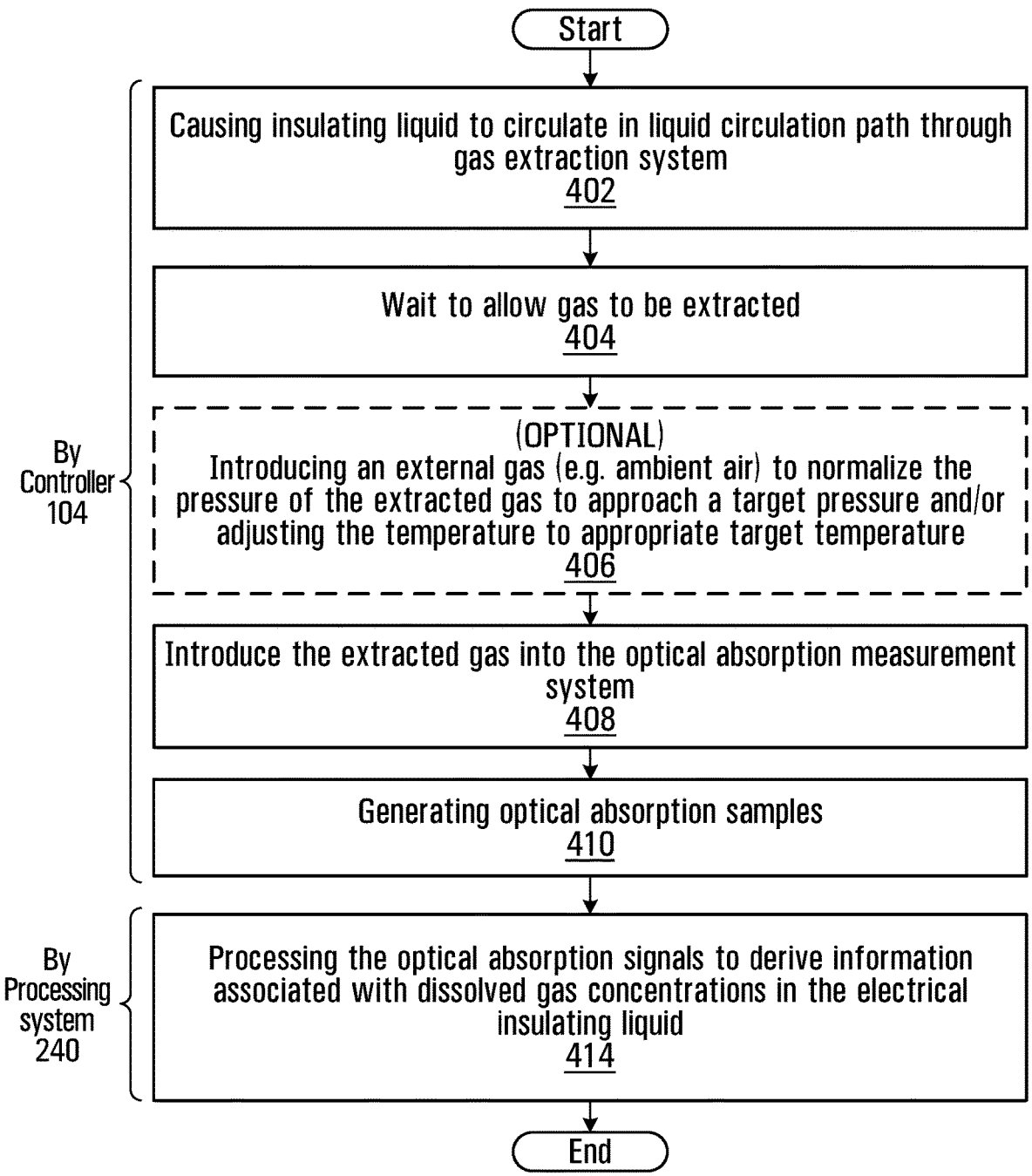
FIG. 13 is a flow diagram of a process implemented by the DGA apparatus 100 shown in FIG. 4 in accordance with a non-limiting example of implementation of the present invention.

A very specific process that may be implemented by apparatus 100 operating in accordance with the analysis mode is shown in FIG. 13.

With reference to FIG. 13, at step 402, electrical insulating liquid is caused to circulate through liquid circulation path 6 using pump 40 so that the insulating liquid goes through the gas extraction system 76.

At step 404, the system waits for a certain time delay to elapse to allow gas from insulating liquid to be extracted y the gas extraction system 77. Once the certain period of time has elapsed, the method then proceeds to optional step 406 or to step 408.

At optional step 406, temperature and/or pressure characteristics of the extracted gas are adjusted to approach a target pressure and/or a target temperature. In particular, optional step 406 may include using the pressure regulating element 760 to introduce an external gas into the gas extracted from the electrical insulating liquid to normalize the pressure so that the mixed-gas sample has a pressure approaching the target pressure. Optional step 406 may also include, using a temperature regulation element (not shown in the figures) to heat (or cool) the gas extracted from the electrical insulating liquid to normalize the temperature so that the gas has a temperature approaching the target temperature. The method then proceeds to step 408.

At step 408, the extracted gas is introduced into the optical absorption measurement system 200. This involve setting the apparatus 100 to operate according to the analysis mode by appropriately setting valves 38a and 38b. The method then proceeds to step 410.

At step 410, the gas in the sample cell 58 of the optical absorption measurement system 200 is excited using an electromagnetic energy source to produce a first set of IR absorption signals associated with the gas sample. The gas may be excited at one or more specific energy bands (for example by selecting appropriate filters) in order to target specific gas species in the gas in the sample cell 58.

At step 414, the optical absorption signals associated with the gas sample derived at step 410 are processed with the processing system 240 using suitable calculation/modeling approaches in order to derive information associated with the concentrations of specific gas species present in the gas sample and/or to derive information conveying a fault status (or alternatively a fault level ranking) of the electrical equipment 4.

The specific calculation/modeling approaches used in different implementations may differ and will depend on a number of factors which may include, without being limited to, the configuration of the components of the optical measurement system and the specific target species whose concentration information is being measured. Specific suitable calculation modeling approaches that may be used in practical implementations will become apparent to the person skilled in the art in view of the present description and as such will not be described in further detail here.

More specifically, the calculations performed at step 414 make use of the quantified deviations between a recently derived (observed) response to a calibration instance and an expected response of the optical absorption measurement system to compensate the information derived at step 414 associated to concentrations of specific gas species present in the gas sample.

Specific gas species whose concentration may be measured include one or more of the following: carbon dioxide ($CO_2$), carbon monoxide (CO), ethane ($C_2H_6$), methane ($CH_4$), ethylene ($C_2H_4$) and acetylene ($C_2H_2$). The concentrations of the dissolved gas species above may be reported in "parts per million" by volume (ppm) at a given temperature and pressure, commonly 0 degrees Celsius and 14.6 PSIA. For example, in a practical implementation, the processing system 240 may be configured to detect/quantify one or more of dissolved gas concentrations of at least 2 ppm CO (e.g., 2-50,000 ppm); at least 20 ppm $CO_2$ (e.g., 20-50,000 ppm); at least 2 ppm $CH_4$ (2-50,000 ppm); at least 0.5 ppm $C_2H_2$ (e.g., 0.5-50,000 ppm); at least 2 ppm $C_2H_6$ (e.g., 2-50,000 ppm); at least 2 ppm $C_2H_4$ (e.g., 2-50,000 ppm).

As shown in FIG. 13, in some implementations, steps 402 404 406 408 410 may be performed by the controller 104 and step 414 may be performed by the processing system 240.

Other practical examples of implementations will become apparent to the reader in view of the teachings of the present description and as such, will not be further described here.

Practical Example of Implementation for Processing System 240

Those skilled in the art should appreciate that in some non-limiting embodiments, all or part of the functionality previously described herein with respect to the processing system 240 of the apparatus 100 for providing the dissolved gas analysis functionality including calibration functionality as described throughout this specification, may be implemented using pre-programmed hardware or firmware elements (e.g., microprocessors, FPGAs, application specific integrated circuits (ASICs), electrically erasable programmable read-only memories (EEPROMs), etc.), or other related components.

In other non-limiting embodiments, all or part of the functionality previously described herein with respect to the processing system 240 of the apparatus 100 may be implemented as software consisting of a series of program instructions for execution by one or more computing units. The series of program instructions can be tangibly stored on one or more tangible computer readable storage media, or the instructions can be tangibly stored remotely but transmittable to the one or more computing unit via a modem or other interface device (e.g., a communications adapter) connected to a computer network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the program instructions may be written in a number of suitable programming languages for use with many computer architectures or operating systems.

Figure 14:
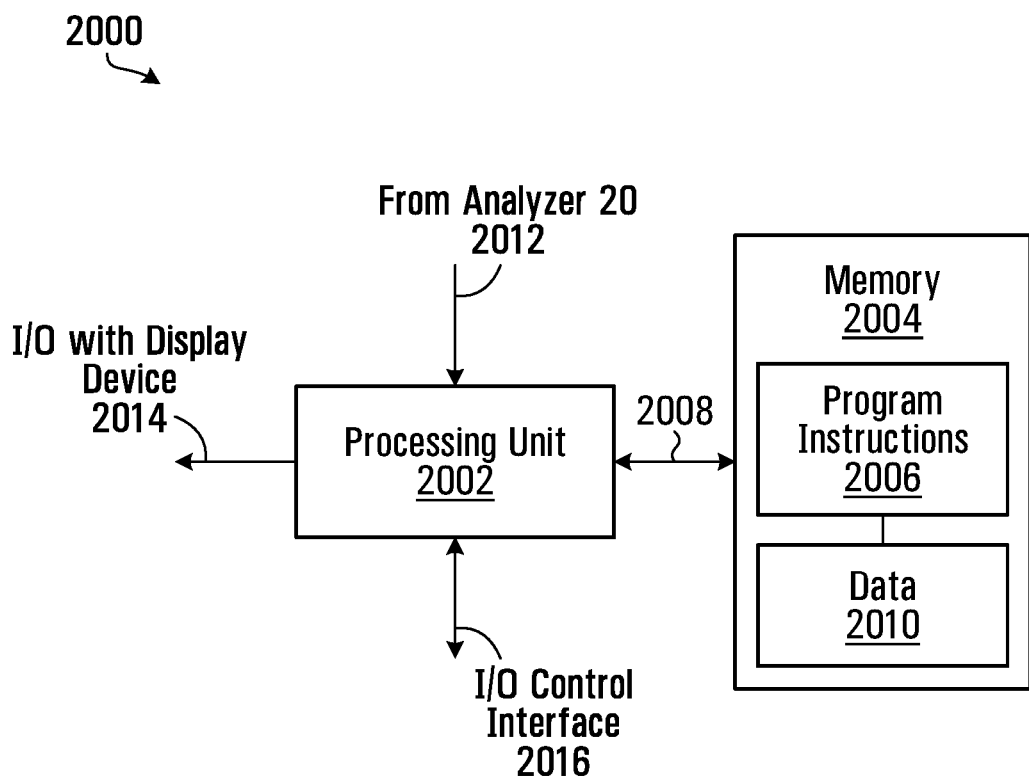
FIG. 14 is a block diagram of an apparatus suitable for implementing the processing system 240 of the DGA apparatus 100 of FIG. 4 in accordance with a specific example of implementation of the present invention.

In a non-limiting example, some or all the functionality of the processing system 240 may be implemented on a suitable microprocessor 2000, of the type depicted in FIG. 14. Such a microprocessor 2000 typically includes a processing unit 2002 and a memory 2004 that is connected by a communication bus 2008. The memory 2004 includes program instructions 2006 and data 2010. The processing unit 2002 is adapted to process the data 2010 and the program instructions 2006 in order to implement the functionality described and depicted in the drawings with reference to the processing system 240. The microprocessor 2000 may also comprise one or more I/O interfaces for receiving or sending data elements to external modules. In particular, the microprocessor 2000 may comprise an I/O interface 2012 with the analyzer 20 of the apparatus 100, an I/O interface 2014 for exchanging signals with an output device (such as a display device) and an I/O interface 2016 for exchanging signals with a control interface (not shown).

General System for Providing DGA Monitoring, Analysis and Calibration Functionality The person skilled in the art will appreciate that, while the block diagram of the apparatus 100 depicted in FIG. 4 has shown some features for performing dissolved gas analysis on a piece of electrical equipment, including calibration functionality, it is to be appreciated that such features may constitute but a subset of the features within an actual commercial DGA apparatus.

Figure 15:
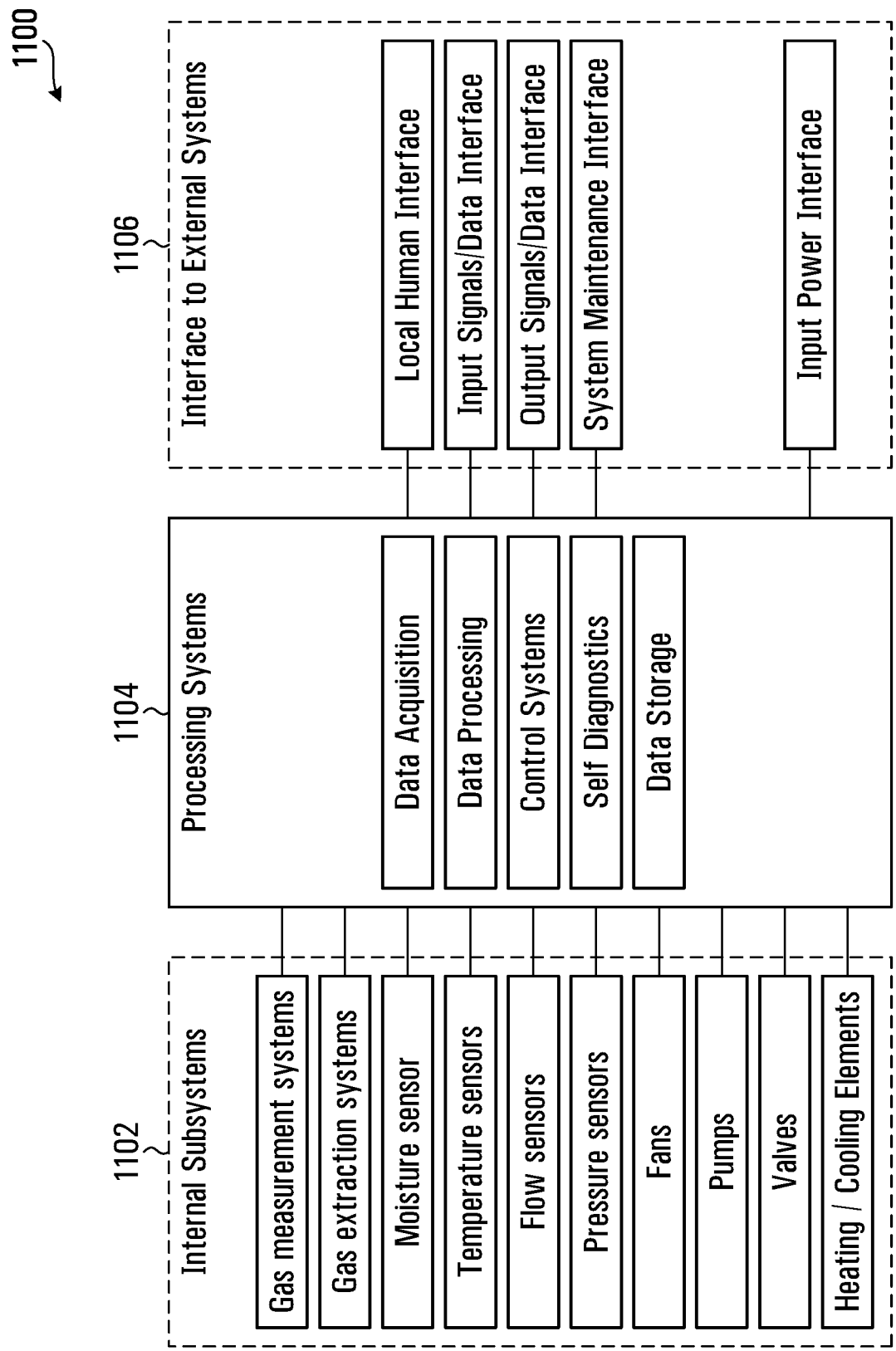
FIG. 15 is a block diagram showing three types of subsystems (internal 1102, processing systems 1104 and interfaces to external system 1106) interconnected to one another to provide DGA monitoring and analysis functionality, including functionality provided by the DGA apparatus depicted in FIG. 4, in accordance with a non-limiting example of implementation of the present invention.
Figure 16:
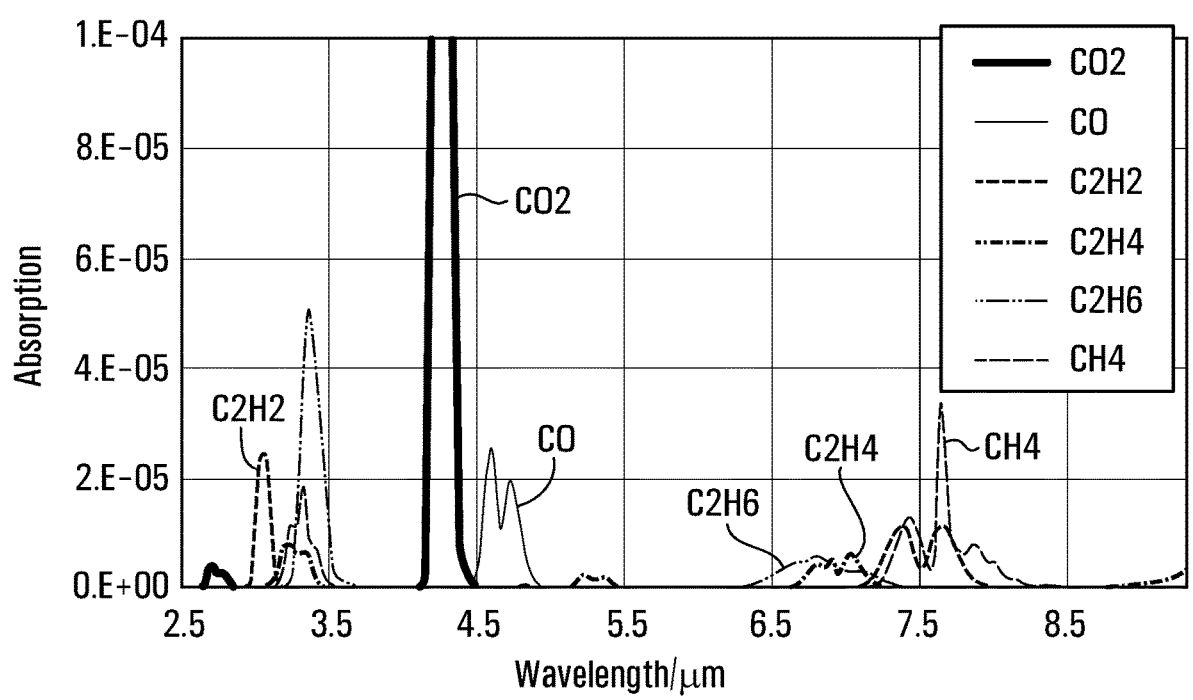
FIG. 16 is a diagram showing absorption spectra for typical DGA gases including $CO_2$, CO, $C_2H_2$, $C_2H_4$, $C_2H_6$ and $CH_4$.

FIG. 15 is a block diagram showing three types of subsystems (internal 1102, processing systems 1104 and interfaces to external system 1106) interconnected to provide DGA monitoring and analysis functionality. The subsystems may have many interconnections and data and control signals flow in both directions between many of them—these have been omitted for the purpose of clarity in the figure.

As depicted, internal subsystems 1102 may include, without being limited to, heating/cooling elements, flow sensors, temperature sensors, moisture sensors, including moisture sensor 150 (shown in FIG. 4), other (complementary) gas measurement systems, other gas extraction systems, fans, pumps, valves, pressure sensors.

As depicted, the processing system 1104 may include, without being limited to, data acquisition, data processing (which may implement the functionality of processing system 240 describe above), control, self-diagnostics, calibration and data storage.

In addition, also as depicted, the interfaces to external systems 1106 may include, without being limited to, one or more local human interfaces, input signal/data interfaces, output signal/data interfaces, system maintenance interface and input power interfaces. The human interface may include any suitable display and/or illuminated indicators, and/or buttons and/or touch screen. Input signal/data interfaces may include interfaces for signals from external sensors (e.g. analogue inputs), and/or digital communications to effect the operation of the system. Output signal/data interfaces may include for example logic-level outputs (relays), analogue outputs and/or digital communications. The digital communications may be carried by copper, optical fiber, or wireless media, or any combination thereof. The digital communications may include, without being limited to, the use of Ethernet or Serial communication protocols, and may include the use of industrial communication protocols such as DNP3, Modbus, IEC 61850. The signals being sent/received through these interfaces (local human interfaces, input signal/data interfaces, output signal/data interfaces) may convey (for example but without being limited to) system status, system settings, measured concentrations and rates of change of concentrations of the dissolved gases and moisture, status of dissolved gas and/or moisture levels and rates of change in relation to pre-set thresholds, interpretations of dissolved gas and/or moisture levels based on algorithms adapted to that purpose, and system events. The system maintenance interface may include a digital communication interface to enable firmware updates and settings updates, for example. In addition, the put power interface may in some implementations be configured to monitor power quality, filter the incoming power, control conducted emissions, and protect the system from voltage spikes and power dropouts.

It will be appreciated by the person skilled in the art in view of the present description that the subsystems depicted in FIG. 15 have been shown for the purpose of illustration only and that a detailed description of these subsystems is beyond the scope of the present application and will thus not be described in further detail here.

Note that titles or subtitles may be used throughout the present disclosure for convenience of a reader, but in no way these should limit the scope of the invention. Moreover, certain theories may be proposed and disclosed herein; however, in no way they, whether they are right or wrong, should limit the scope of the invention so long as the invention is practiced according to the present disclosure without regard for any particular theory or scheme of action.

All references cited throughout the specification are hereby incorporated by reference in their entirety for all purposes.

It will be understood by those of skill in the art that throughout the present specification, the term "a" used before a term encompasses embodiments containing one or more to what the term, refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

Although various embodiments of the disclosure have been described and illustrated, it will be apparent to those skilled in the art in light of the present description that numerous modifications and variations can be made. The scope of the invention is defined more particularly in the appended claims.

What is claimed is:

1. A method for calibrating a dissolved gas analysis apparatus, the dissolved gas analysis apparatus including an analyser having an optical absorption measurement system configured to use one or more electromagnetic energy sources to obtain optical absorption measurements associated with a gas sample, the method comprising:
   a. deriving an observed response of the optical absorption measurement system at least in part by using the optical absorption measurement system to obtain optical absorption measurements for a reference gas under a plurality of distinct moisture conditions and processing the obtained optical absorption measurements under the plurality of distinct moisture conditions to derive the observed response of the optical absorption measurement system;
   b. processing the derived observed response of the optical absorption measurement system to quantify deviations between the derived observed response and an expected response of the optical absorption measurement system; and
   c. using the quantified deviations between the derived observed response and the expected response to compensate information associated with gas concentration measurements derived by the dissolved gas analysis apparatus.

2. A method as defined in claim 1, wherein deriving the observed response of the optical absorption measurement system includes using a moisture sensor to obtain moisture level measurements for the reference gas under the plurality of distinct moisture conditions.

3. A method as defined in claim 2, wherein the moisture sensor is a capacitive moisture sensor.

4. A method as defined in claim 2, wherein the moisture level measurements convey moisture contents in the reference gas under the plurality of distinct moisture conditions.

5. A method as defined in claim 1, wherein the plurality of distinct moisture conditions includes at least two distinct moisture conditions.

6. A method as defined in claim 1, wherein at least one of the plurality of distinct moisture conditions is associated with a moisture level established, at least in part, by a moisture level of ambient air.

7. A method as defined in claim 1, wherein the at least one of the plurality of distinct moisture conditions results at least in part from exposure of the reference gas to a source of water vapor.

8. A method as defined in claim 7, wherein the exposure of the reference gas to the source of water vapor is made either directly or via a moisture permeable membrane.

9. A method as defined in claim 1, wherein the at least one of the plurality of distinct moisture conditions results at least in part from exposure of the reference gas to a moisture absorbing material.

10. A method as defined in claim 9, wherein the exposure of the reference gas to the moisture absorbing material is made either directly or via a moisture permeable membrane.

11. A method as defined in claim 1, wherein deriving the observed response of the optical absorption measurement system includes using a humidity control system to induce in the reference gas a specific moisture condition amongst the plurality of distinct moisture conditions and processing optical absorption measurements under the specific moisture condition to derive at least part of the observed response of the optical absorption measurement system.

12. A method as defined in claim 11, wherein the humidity control system includes at least one of moisture absorbing material and a source of water vapor to induce the specific moisture condition in the reference gas.

13. A method as defined in claim 12, wherein the humidity control system includes a membrane at least partially permeable to moisture.

14. A method as defined in claim 1, wherein deriving the observed response of the optical absorption measurement system is performed at least in part by:
   i. filling a gas measurement chamber in the analyser with the reference gas under each of the plurality of distinct moisture conditions;
   ii. using the optical absorption measurement system to obtain the optical absorption measurements of at least one of water vapour and specific target gases in the gas measurement chamber for the reference gas under each of the plurality of distinct moisture conditions.

15. A method as defined in claim 1, wherein the reference gas includes ambient air.

16. A method as defined in claim 1, wherein using the optical absorption measurement system to obtain optical absorption measurements for the reference gas includes:
   i. using the one or more electromagnetic energy sources to excite a sample of the reference gas in a plurality of different wavelength ranges to generate a set of corresponding optical signals, the plurality of different wavelength ranges including one or more moisture sensitive wavelength ranges; and
   ii. obtaining the optical absorption measurements at least in part by measuring the set of corresponding signals at the plurality of different wavelength ranges.

17. A method as defined in claim 16, wherein the derived observed response of the optical absorption measurement system conveys response parameters associated with respective wavelength ranges including the one or more moisture sensitive wavelength ranges.

18. A method as defined in claim 1, wherein the plurality of distinct moisture conditions under which were obtained the optical absorption measurements for the reference gas are a plurality of achieved distinct moisture conditions and wherein the expected response of the optical absorption measurement system is derived at least in part by processing:
   a. an initial response of the absorption measurement system;
   b. a plurality of initial distinct moisture conditions associated with the initial response of the absorption measurement system; and
   c. the plurality of achieved distinct moisture conditions.

19. A method as defined in claim 18, wherein the initial response of the optical absorption measurement system is derived using a field initialization process.

20. A method as defined in claim 1, wherein the information associated with gas concentration measurements derived by the gas analysis apparatus conveys concentrations of one or more specific target gases.

21. A method as defined in claim 20, wherein the one or more specific target gases are selected from the set consisting of carbon dioxide (CO2), carbon monoxide (CO), ethane (C2H6), methane (CH4), ethylene (C2H4) and acetylene (C2H2).

22. A method as defined in claim 1, wherein at least one of the one or more electromagnetic energy sources is an IR electromagnetic energy source and wherein the optical absorption signals are IR absorption signals.

23. A method for calibrating a dissolved gas analysis apparatus, the dissolved gas analysis apparatus including an analyser having an optical absorption measurement system configured to use one or more electromagnetic energy sources to obtain optical absorption measurements associated with a gas sample, the method comprising:
   i. using the optical absorption measurement system to obtain optical absorption measurements, at least some of the optical absorption measurements being derived by using the optical absorption measurement system under a plurality of distinct moisture conditions;
   ii. processing the obtained optical absorption measurements to derive an initial response of the optical absorption measurement system;
   iii. storing the initial response in a non-transitory computer readable medium for use in quantifying deviations between expected responses of the optical absorption measurement system and observed responses of the optical absorption measurement system.

24. A method as defined in claim 23, wherein using the optical absorption measurement system to obtain optical absorption measurements is performed at least in part by:
   i. filling a gas measurement chamber in the analyser with the reference gas under each of the plurality of distinct moisture conditions;
   ii. using the optical absorption measurement system to obtain the optical absorption measurements for the reference gas under each of the plurality of distinct moisture conditions.

25. A method as defined in claim 23, wherein using the optical absorption measurement system to obtain optical absorption measurements is performed at least in part by:
   i. filling a gas measurement chamber in the analyser with a specific gas containing specific concentrations of one or more specific target gases;
   ii. using the optical absorption measurement system to obtain the optical absorption measurements for the specific gas.

26. A method as defined in claim 23, wherein using the optical absorption measurement system to obtain optical absorption measurements is performed at least in part by obtaining optical absorption measurements for a plurality of gas samples containing specific concentrations of one or more specific target gases.

27. An apparatus for performing dissolved gas analysis on a piece of electrical equipment having components immersed in electrical insulating liquid, the apparatus comprising:
 a. a gas extraction system configured for extracting gas from the electrical insulating liquid, said gas extraction system including at least one of:
  a structure defining a gas extraction space above at least a portion of the electrical insulating liquid to extract gas from the electrical insulating liquid by diffusion; and
  a semi-permeable membrane forming a phase barrier between at least a sample of the electrical insulating liquid and a gas extraction volume, the semi-permeable membrane allowing one or more gas components in the electrical insulating liquid to permeate into the gas extraction volume while restraining permeation of one or more other components;
 b. an analyser for performing gas analysis on gas samples, the analyser having an optical absorption measurement system including one or more electromagnetic energy sources to obtain optical absorption measurements associated with the gas samples;
 c. a processing system in communication with said analyser, said processing system including at least one processor programmed for deriving information associated with dissolved gas concentrations in the electrical insulating liquid at least in part by processing optical absorption measurements obtained by the analyser in connection with a specific gas sample extracted from the electrical insulating liquid, said processing system being programmed for:
  i. periodically performing a calibration process configured to quantify deviations between a derived observed response and an expected response of the optical absorption measurement system at least in part by using the optical absorption measurement system of the analyser to obtain optical absorption measurements for a reference gas under a plurality of distinct moisture conditions and processing the obtained optical absorption measurements under the plurality of distinct moisture conditions to derive the observed response of the optical absorption measurement system;
  ii. compensating the information associated with the dissolved gas concentrations in the electrical insulating liquid at least in part by processing the quantified deviations derived using the calibration process.

28. An apparatus as defined in claim 27, wherein said apparatus is configured for selectively operating according to one of:
 a. an analysis mode in which the analyser is in fluid communication with the gas extraction system for for receiving gas extracted from the electrical insulating liquid;
 b. a calibration mode in which the analyser is in fluid communication with a source for the reference gas for deriving the response of the optical absorption measurement system.

29. An apparatus as defined in claim 28, wherein said apparatus is configured for periodically operating according to the calibration mode to periodically re-calibrate the dissolved gas analysis apparatus.

30. An apparatus as defined in claim 27, comprising a moisture sensor for obtaining moisture level measurements for the reference gas under the plurality of distinct moisture conditions.

31. An apparatus as defined in claim 27, wherein said analyser comprises a humidity control system to induce in the optical absorption measurement system a specific moisture condition amongst the plurality of distinct moisture conditions.

32. An apparatus as defined in claim 31, wherein the humidity control system includes at least one of moisture absorbing material and a source of water vapor to induce the specific moisture condition.

33. An apparatus as defined in claim 27, wherein using the optical absorption measurement system to obtain optical absorption measurements for the reference gas includes:
 i. using the one or more electromagnetic energy sources to excite a sample of the reference gas in a plurality of different wavelength ranges to generate a set of corresponding optical signals, the plurality of different wavelength ranges including one or more moisture sensitive wavelength ranges; and
 ii. obtaining the optical absorption measurements at least in part by measuring the set of corresponding signals at the plurality of different wavelength ranges.

34. An apparatus as defined in claim 27, wherein the plurality of distinct moisture conditions under which are obtained the optical absorption measurements for the reference gas are a plurality of achieved distinct moisture conditions and wherein the expected response of the optical absorption measurement system is derived at least in part by processing:
 a. an initial response of the absorption measurement system;
 b. a plurality of initial distinct moisture conditions associated with the initial response of the absorption measurement system; and
 c. the plurality of achieved distinct moisture conditions.

35. An apparatus as defined in claim 27, wherein the apparatus comprises a liquid inlet and a liquid outlet connectable to the piece of electrical equipment for allowing electrical insulating liquid to circulate between the piece of electrical equipment and the apparatus through a liquid circulation path, said gas extraction system being in communication with the liquid circulation path.

36. An apparatus as defined in claim 27, wherein the one or more electromagnetic energy sources include at least one of a light emitting diode (LEI)), a laser, a hot filament, a micromachined (MEMS) IR emitter, a halogen lamp and any, combination of a light emitting diode (LED), a laser, a hot filament, a micromachined (MEMS) IR emitter and a halogen lamp.

37. An apparatus as defined in claim 27, wherein the piece of electrical equipment includes at least one of a transformer, a tap-changer and a circuit breaker.

38. An apparatus for performing dissolved gas analysis on a piece of electrical equipment having components immersed in electrical insulating liquid, the apparatus comprising:
 a. an analyser for performing gas analysis on a gas sample, the analyser having an optical absorption measurement system including one or more electromagnetic energy sources to obtain optical absorption measurements associated with the gas sample;

b. a processing system in communication with said analyser, said processing system including at least one processor programmed for deriving information associated with dissolved gas concentrations in the electrical insulating liquid at least in part by processing optical absorption signals obtained by the analyser in connection with a specific gas sample extracted from the electrical insulating liquid, said processing system being programmed for compensating the information associated with dissolved gas concentrations in the electrical insulating liquid at least in part by processing quantified deviations between an observed response associated with the analyser and an expected response associated with the analyser, the observed response being derived by using the optical absorption measurement system to obtain optical absorption measurements for a reference gas under a plurality of distinct moisture conditions.

* * * * *